US005463219A

United States Patent [19]

Buckley et al.

[11] Patent Number: 5,463,219

[45] Date of Patent: Oct. 31, 1995

[54] MASS SPECTROMETER SYSTEM AND METHOD USING SIMULTANEOUS MODE DETECTOR AND SIGNAL REGION FLAGS

[75] Inventors: Peter Buckley, Willowdale; Lisa Cousins, Toronto; Todd Daynes, Unionville; Val Gretxhev, Willowdale; Drake Hirasawa, Etobicoke; Graham Leith, Toronto, all of Canada

[73] Assignee: MDS Health Group Limited, Etobicoke, Canada

[21] Appl. No.: 350,767

[22] Filed: Dec. 7, 1994

[51] Int. Cl.[6] .................... B01D 59/44

[52] U.S. Cl. .................... 250/281; 250/282

[58] Field of Search .................... 250/281, 282, 250/288, 283

[56] References Cited

U.S. PATENT DOCUMENTS 4,472,630 9/1984 Schoen .................... 250/281

OTHER PUBLICATIONS

Michael J. Kristo and Christie G. Enke, "System for Simultaneous Count/Current Measurement with a Dual-Mode Photon/Particle Detector", Rev. Sci. Instrum. 59(3), Mar, 1988, pp. 438–442.

*Primary Examiner*—Jack I. Berman
*Assistant Examiner*—James Beyer
*Attorney, Agent, or Firm*—Bereskin & Parr

[57] ABSTRACT

A mass analyzer system uses a simultaneous mode electron multiplier detector which outputs both a pulse count and an analog signal. Depending on the ion flux intensity, the signals define a pulse count only region in which the pulse count only signal is valid, an overlap region in which both the pulse count and analog signals are valid, an analog signal only region in which only the analog signal is valid, and a neither analog nor pulse region in which neither signal is valid. The system produces a separate flag for each region. When a mass spectrum is scanned, for each dwell the pulse count and analog data are recorded together with their associated flag and are placed in memory. The signals, with the flags, can then be used to produce a mass spectrum using the pulse count only signal, the analog only signal, or both. In addition numeric displays can be produced for each peak or a variety of peaks, using the pulse count only signal, the analog signal, or both, together with a display of the flag or flags which have been set at the peak being displayed.

29 Claims, 34 Drawing Sheets

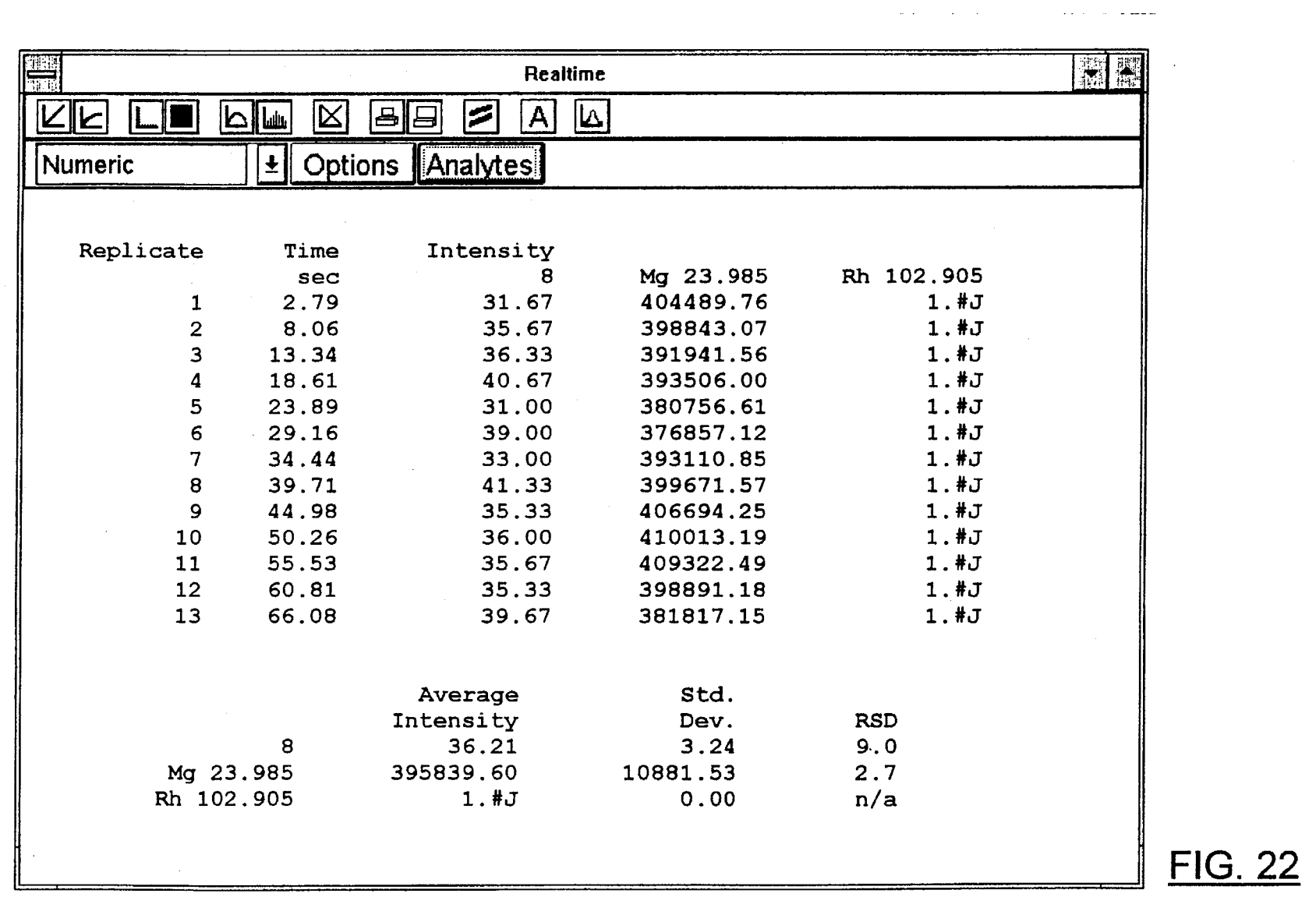

Realtime

Numeric | Options | Analytes

| Replicate | Time sec | Intensity 8 | Mg 23.985 | Rh 102.905 |
|---|---|---|---|---|
| 1 | 2.79 | 31.67 | 404489.76 | 1.#J |
| 2 | 8.06 | 35.67 | 398843.07 | 1.#J |
| 3 | 13.34 | 36.33 | 391941.56 | 1.#J |
| 4 | 18.61 | 40.67 | 393506.00 | 1.#J |
| 5 | 23.89 | 31.00 | 380756.61 | 1.#J |
| 6 | 29.16 | 39.00 | 376857.12 | 1.#J |
| 7 | 34.44 | 33.00 | 393110.85 | 1.#J |
| 8 | 39.71 | 41.33 | 399671.57 | 1.#J |
| 9 | 44.98 | 35.33 | 406694.25 | 1.#J |
| 10 | 50.26 | 36.00 | 410013.19 | 1.#J |
| 11 | 55.53 | 35.67 | 409322.49 | 1.#J |
| 12 | 60.81 | 35.33 | 398891.18 | 1.#J |
| 13 | 66.08 | 39.67 | 381817.15 | 1.#J |

| | Average Intensity | Std. Dev. | RSD |
|---|---|---|---|
| 8 | 36.21 | 3.24 | 9.0 |
| Mg 23.985 | 395839.60 | 10881.53 | 2.7 |
| Rh 102.905 | 1.#J | 0.00 | n/a |

FIG. 22

| Replicate | Time sec | Intensity 8 | Mg 23.985 | Rh 102.905 |
|---|---|---|---|---|
| 1 | 2.79 | 508.33 | 187575.00 | 909125.00 |
| 2 | 8.06 | 514.67 | 185570.00 | 879555.00 |
| 3 | 13.34 | 523.67 | 182120.00 | 879650.00 |
| 4 | 18.61 | 528.00 | 183825.00 | 898715.00 |
| 5 | 23.89 | 528.33 | 178060.00 | 868940.00 |
| 6 | 29.16 | 537.00 | 175895.00 | 905645.00 |
| 7 | 34.44 | 560.67 | 183875.00 | 902650.00 |
| 8 | 39.71 | 610.33 | 186320.00 | 921425.00 |
| 9 | 44.98 | 565.00 | 188145.00 | 936695.00 |
| 10 | 50.26 | 586.33 | 192275.00 | 913490.00 |
| 11 | 55.53 | 570.00 | 190925.00 | 884435.00 |
| 12 | 60.81 | 571.00 | 185915.00 | 881470.00 |
| 13 | 66.08 | 570.33 | 178930.00 | 873760.00 |

| | Average Intensity | Std. Dev. | RSD |
|---|---|---|---|
| 8 | 551.82 | 30.70 | 5.6 |
| Mg 23.985 | 184571.54 | 4864.16 | 2.6 |
| Rh 102.905 | 896581.15 | 20474.37 | 2.3 |

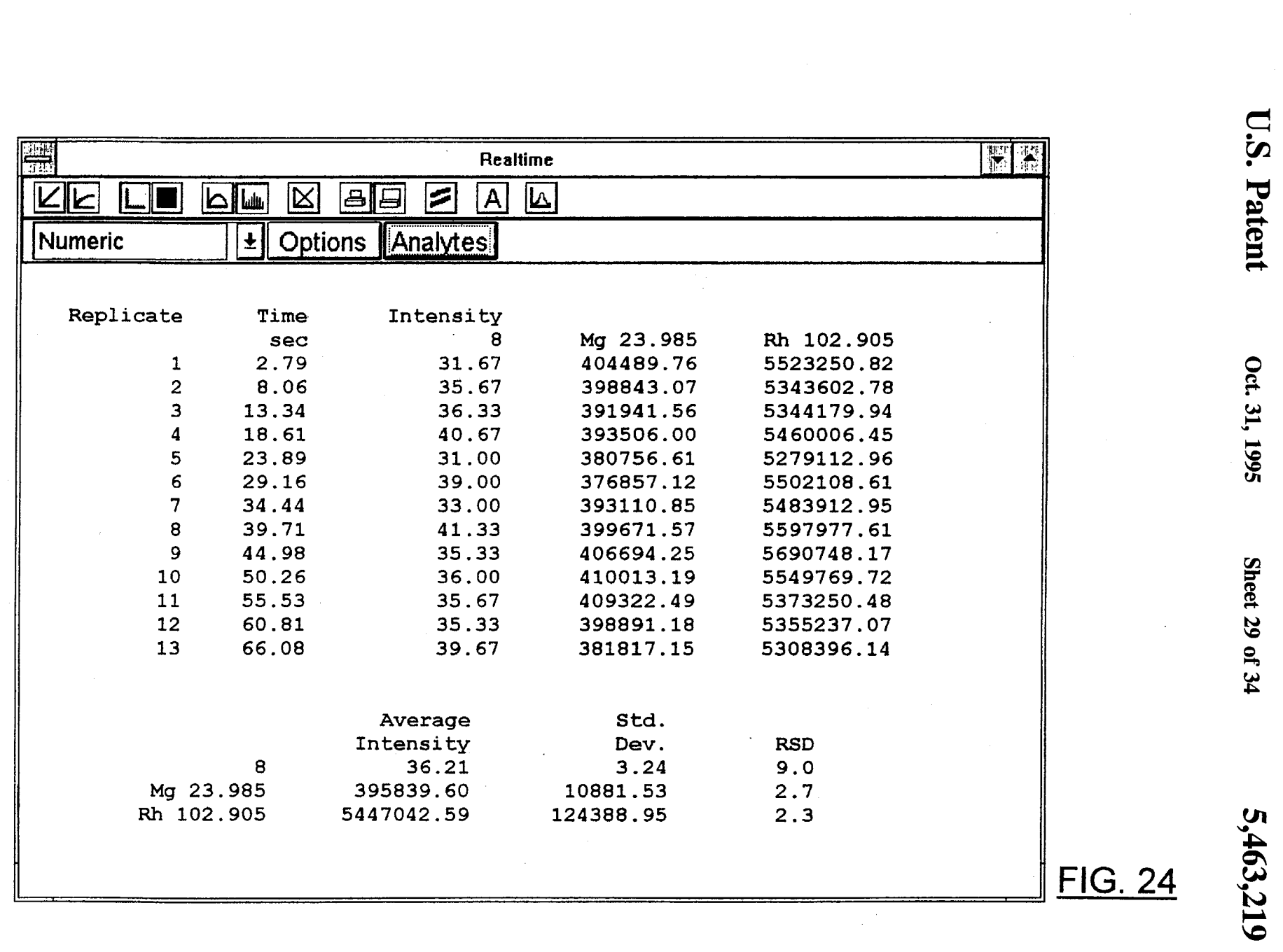

Realtime

Numeric | Options | Analytes

| Replicate | Time sec | Intensity 8 | Mg 23.985 | Rh 102.905 |
|---|---|---|---|---|
| 1 | 2.79 | 31.67 | 404489.76 | 5523250.82 |
| 2 | 8.06 | 35.67 | 398843.07 | 5343602.78 |
| 3 | 13.34 | 36.33 | 391941.56 | 5344179.94 |
| 4 | 18.61 | 40.67 | 393506.00 | 5460006.45 |
| 5 | 23.89 | 31.00 | 380756.61 | 5279112.96 |
| 6 | 29.16 | 39.00 | 376857.12 | 5502108.61 |
| 7 | 34.44 | 33.00 | 393110.85 | 5483912.95 |
| 8 | 39.71 | 41.33 | 399671.57 | 5597977.61 |
| 9 | 44.98 | 35.33 | 406694.25 | 5690748.17 |
| 10 | 50.26 | 36.00 | 410013.19 | 5549769.72 |
| 11 | 55.53 | 35.67 | 409322.49 | 5373250.48 |
| 12 | 60.81 | 35.33 | 398891.18 | 5355237.07 |
| 13 | 66.08 | 39.67 | 381817.15 | 5308396.14 |

| | Average Intensity | Std. Dev. | RSD |
|---|---|---|---|
| 8 | 36.21 | 3.24 | 9.0 |
| Mg 23.985 | 395839.60 | 10881.53 | 2.7 |
| Rh 102.905 | 5447042.59 | 124388.95 | 2.3 |

FIG. 24

MASS SPECTROMETER SYSTEM AND METHOD USING SIMULTANEOUS MODE DETECTOR AND SIGNAL REGION FLAGS

FIELD OF THE INVENTION

This invention relates to a mass spectrometer system using a two-stage electron multiplier detector, in which the first stage provides an analog signal and the second stage provides an pulse count signal. More particularly, it relates to such a system in which during each mass spectrum scan both the pulse count and analog data are recorded, and in which in a preferred embodiment, a mass spectrum using either set of data, or both sets of data, can be displayed and can also be stored in memory for further manipulation.

BACKGROUND OF THE INVENTION

Various data acquisition systems are used in mass spectrometry. One such system used very commonly in inductively coupled plasma mass spectrometry (ICP-MS) is the electron multiplier detector, which detects ions impinging on its dynodes and amplifies the resultant signal to a usable level. Because electron multipliers operating in a pulse count mode have a limited range (too high an ion flux causes saturation), a separate mode of operation of the same detector, namely an analog mode, has commonly been implemented. However, this lacks speed of response and the ability to detect very low and very high signals at the same scan time. Thus, in order to detect these signals simultaneously at high speed, dual output electron multipliers (also called simultaneous mode electron multipliers) were constructed and placed on the market in about 1979. Simultaneous mode electron multipliers contain two dynode stages in series, separated by an analog collector, and also having a protection dynode and a ground dynode. Ions incident on the first dynode stage produce an electron signal, about half of which is collected at the analog collector to produce an analog signal. If the voltage on the protection dynode is set at the appropriate level, the remaining electrons pass through the second stage to produce a pulse count signal. If and when the analog signal rises to a specified level (indicating a relatively high ion flux), the high analog signal triggers application of a suitable voltage to the protection dynode to prevent electrons from passing through the second stage and burning out the detector. Simultaneous mode electron multiplier detectors are marketed by Galileo ElectroOptics Corp. of Sturbridge, Mass., and by ETP Scientific of Auburne, Mass.

The use of simultaneous mode electron multiplier detectors has been described by M. J. Kristo and C. G. Enke in an article in Rev. Sci. Instruments, 59(3), March, 1988. In the system there described, the processing system detects whether the protection dynode is on or off, and if it is on or if there is any doubt about whether it is on, only analog data is acquired.

The prior methods of using simultaneous mode electron multiplier detectors have various disadvantages. One disadvantage is that the user receives no information as to whether the pulse counting or analog signal is being used. Thus, if the gain of the analog stage or pulse stage is drifting, the conversion factor between the two signals may become inaccurate. A second disadvantage is that each point in each peak is constructed using only one signal or the other, but it is not always desirable to use the analog signal converted to correlate with the pulse signal, and prior art systems do not permit a choice. A third disadvantage is that prior art simultaneous mode detectors do not collect and store pulse count, analog and converted analog data so as to permit any or all data to be manipulated later for analysis or diagnostic purposes. A fourth disadvantage of prior art systems is that they do not conveniently allow a process known as "peak hopping", where only peak maxima are measured for a variety of signal levels and elements.

BRIEF SUMMARY OF THE INVENTION

Accordingly, it is an object of the present invention to provide a mass analyzer system using a dual range electron multiplier in which data is acquired and processed in a more useful manner than in the past. In one embodiment the invention provides a mass analyzer system comprising:

(a) a mass analyzer, (b) an ion lens, (c) means for directing ions through said ion lens and into said mass analyzer, (d) a simultaneous mode electron multiplier detector coupled to said mass analyzer for detecting ions passing therethrough, (e) said detector comprising first and second dynode stages, and a plurality of electrodes including an analog signal electrode for providing an analog signal and a pulse counting electrode associated with said second dynode stage for providing a pulse count signal, (f) logic means including first and second comparator means coupled to one of said electrodes for receiving an indication of the level of said analog signal, said first comparator means being responsive to a predetermined level of said analog signal to disable said pulse count signal, said second comparator means being responsive to a second and higher level of said analog signal for reducing the number of ions incident on said detector for disabling both said analog and said pulse count signals, (g) said signals defining a first region in which at least one of said pulse count signal and said analog signal is valid, a second region in which only said analog signal is valid, and a third region in which neither said analog nor said pulse count signal is valid, (h) said logic means including means responsive to the region in which said signals are located for producing a first flag when said signals are in said first region, a second flag when said signals are in said second region, and a third flag when said signals are in said third region, said flags being different from each other, (i) memory means, (j) and means for transmitting to and storing in said memory means the values of said signals and their associated flags for each dwell of said mass analyzer.

In another aspect the invention provides a method of operating a mass analyzer system of the kind having a mass analyzer, an ion lens, means for directing ions through said ion lens into said mass analyzer, a simultaneous mode electron multiplier detector coupled to said mass analyzer for detecting ions passing therethrough, said detector comprising first and second dynode stages, and a plurality of electrodes including an analog signal electrode for providing an analog signal and a pulse counting electrode for providing a pulse count signal, said method comprising defining a first region in which at least one of said pulse count signal and said analog signal is valid, a second region in which only said analog signal is valid, and a third region in which neither of said signals is valid, and producing a first flag when said signals are in said first region, a second flag when said signals are in said second region, and a third flag when said signal are in said third region, said flags each being different from each other, and then scanning said mass spectrometer system through a plurality of points in a mass spectrum, causing said mass spectrometer system to dwell at each point, and transmitting to and storing in memory the pulse and analog signals produced at each point together with the flag associated with said signals at said point.

In another aspect the invention provides a method of operating a mass analyzer system of the kind having a mass analyzer, an ion lens, means for directing ions through said ion lens into said mass analyzer, a simultaneous mode electron multiplier detector coupled to said mass analyzer for detecting ions passing therethrough, said detector comprising first and second dynode stages, and a plurality of electrodes including an analog signal electrode for providing an analog signal and a pulse counting electrode for providing a pulse count signal, said method comprising defining a first region in which at least one of said pulse count signal and said analog signal is valid, a second region in which only said analog signal is valid, and a third region in which neither of said signals is valid, directing a stream of ions into said system, said stream being of a first intensity such as to cause said signal to be in one of said analog only region and said neither analog nor pulse region, attenuating said stream of ions to reduce the intensity thereof to a second intensity such that said signal is in said overlap region, then calibrating said detector by determining the relationship between said analog and said pulse count signals in said overlap region at a plurality of different masses and producing a curve relating said analog signal to said pulse counting signal over said plurality of different masses.

In yet another aspect the invention provides a method of storing and then processing a signal stream from a mass spectrometer system, said system being of the kind having a mass analyzer, means for directing ions through said ion lens into said mass analyzer, and an electron multiplier detector coupled to said mass analyzer for detecting ions passing therethrough, said signal stream comprising at least one of a pulse count signal and an analog signal, said signal stream having a pulse count only region in which said pulse count signal only is valid, an overlap region in which said pulse count signal and said analog signal are valid, an analog signal only region in which only said analog signal is valid, and a neither analog nor pulse region in which neither of said signals is valid, said signal stream further including a first flag when said signals are in said pulse only region, a second flag when said signals are in said overlap region, a third flag when said signals are in said analog only region, and a fourth flag when said signals are in said neither analog nor pulse region, said flags each being different from each other, said method comprising storing in memory data from said signal stream indicative of the values of at least one of said pulse count signal and said analog signal at a plurality of points in a mass spectrum, storing in memory the said flag associated with the signal at each said point, then retrieving from memory said data representative of said signal at at least some of said points, together with the flag associated with the data at each such point, and then displaying from the retrieved data a characteristic of said mass spectrum.

Further objects and advantages of the invention will appear from the following disclosure, taken together with the accompanying drawings.

BRIEF DESCRIPTION OF THE DRAWINGS

In the drawings:

FIG. 22 shows a numeric screen print made using a pulse counting signal only;

FIG. 24 shows a numeric screen print made using both pulse and analog signals;

DETAILED DESCRIPTION OF PREFERRED EMBODIMENTS

ICP-MS SYSTEM

Figure 1:
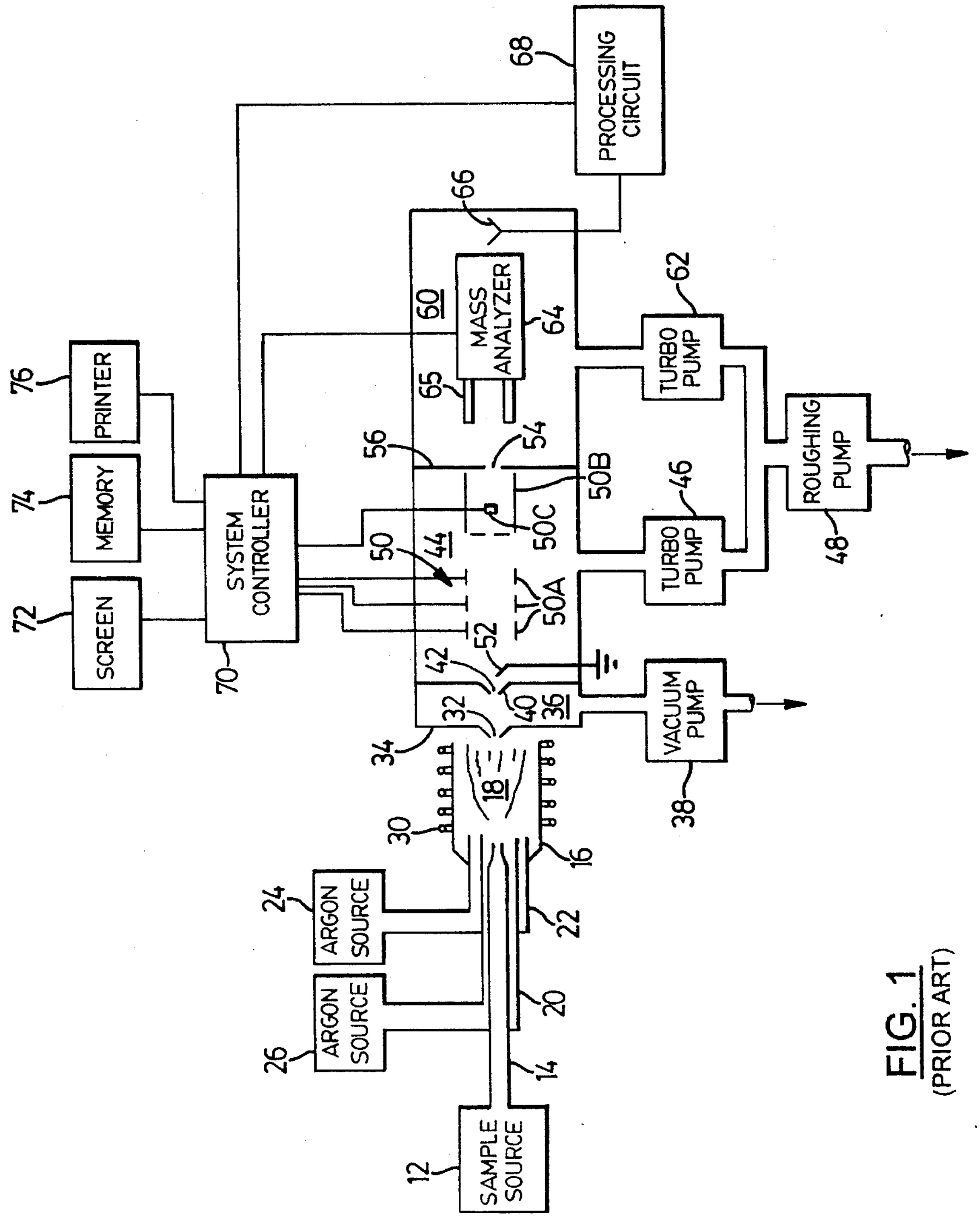
FIG. 1 (PRIOR ART)
FIG. 1 is a diagrammatic view of a conventional ICP-MS system with which the present invention may be used.

Reference is first made to FIG. 1, which shows a conventional prior art ICP-MS system generally indicated by reference numeral 10. The system 10 is typically that sold under the trade mark ELAN by Sciex Division of MDS Health Group Limited of Thornhill, Ontario, Canada (the assignee of the present invention) and is described in U.S. Pat. No. 4,746,794 and in pending U.S. patent application Ser. No. 08/059,393 entitled "Method of Plasma Mass Analysis with Reduced Space Charge Effects", now U.S. Pat. NO. 5,381,008. Since system 10 is well known, it will be described only briefly.

System 10 includes a sample source 12 which supplies a sample contained in a carrier gas (e.g. argon) through a tube 14 into a quartz tube 16 which contains a plasma 18. Two outer tubes 20, 22 concentric with tube 14 provide outer flows of argon, as is conventional. The argon is supplied from sources 24, 26.

The plasma 18 is generated at atmospheric pressure by an induction coil 30 encircling the quartz tube 16. Such torches are well known. Plasma 18 can also be generated using microwave or other suitable energy sources.

As is well known, the plasma 18 atomizes the sample stream and also ionizes the atoms so produced, creating a mixture of ions and free electrons. A portion of the plasma is sampled through an orifice 32 and a sampler 34 (protected by water cooling, not shown) which forms a wall of a first vacuum chamber 36. Vacuum chamber 36 is evacuated to a moderately low pressure, e.g. 1 to 5 Torr, by a vacuum pump 38.

At the other end of vacuum chamber 36 from sampler 34, there is located a skimmer 40 having an orifice 42 which opens into a second vacuum chamber 44. Vacuum chamber is evacuated to a much lower pressure (e.g. $10^{-3}$ Torr or less) by a separate turbo vacuum pump 46, backed by a conventional mechanical roughing pump 48 (since turbo pumps normally discharge into a partially evacuated region).

Vacuum chamber 44 contains ion optics or lenses generally indicated at 50 and typically being as described in U.S. Pat. No. 4,746,794 or in the above-mentioned copending U.S. patent application. For example the ion optics 50 may include a three element Einzel lens 50*a*, followed by a Bessel box lens 50*b* having a conventional center stop 50*c*. Vacuum chamber 44 may also contain a shadow stop 52 to prevent debris from the plasma from reaching the ion optics. Other forms of ion optics may also be used.

The ions emerging from the ion optics 50 travel through an orifice 54 in a wall 56 and into a third vacuum chamber 60. Vacuum chamber 60 is evacuated by a second turbo pump 62 also backed by the roughing pump 48. Vacuum chamber 60 contains a mass analyzer 64 which is typically a quadrupole mass spectrometer but may be a different form of mass analyzer, e.g. an ion trap. Short AC-only rods 65 (which have a variable RF voltage applied to them but only a fixed DC bias) may be used to focus ions into the mass spectrometer 64. Ions passing through the mass spectrometer 64 are detected by a detector 66, the output of which is processed by a processing circuit 68.

As is well known, ions from the plasma travel with the plasma gas through the sampler orifice 32, and then pass through the skimmer aperture 42, carried by the bulk gas flow. The ions are then charge separated and are focused, by the ion optics 50, through the orifice 54 and into the mass analyzer 64. The ion lens 50 and mass analyzer 64 are controlled by a system controller 70 (also connected to the processing circuit 68) to produce a mass spectrum on monitor screen 72, or using printer 74, for the sample being analyzed. The data collected is stored in a memory 76 so that it can be reprocessed if desired.

DETECTOR 66

Figure 2:
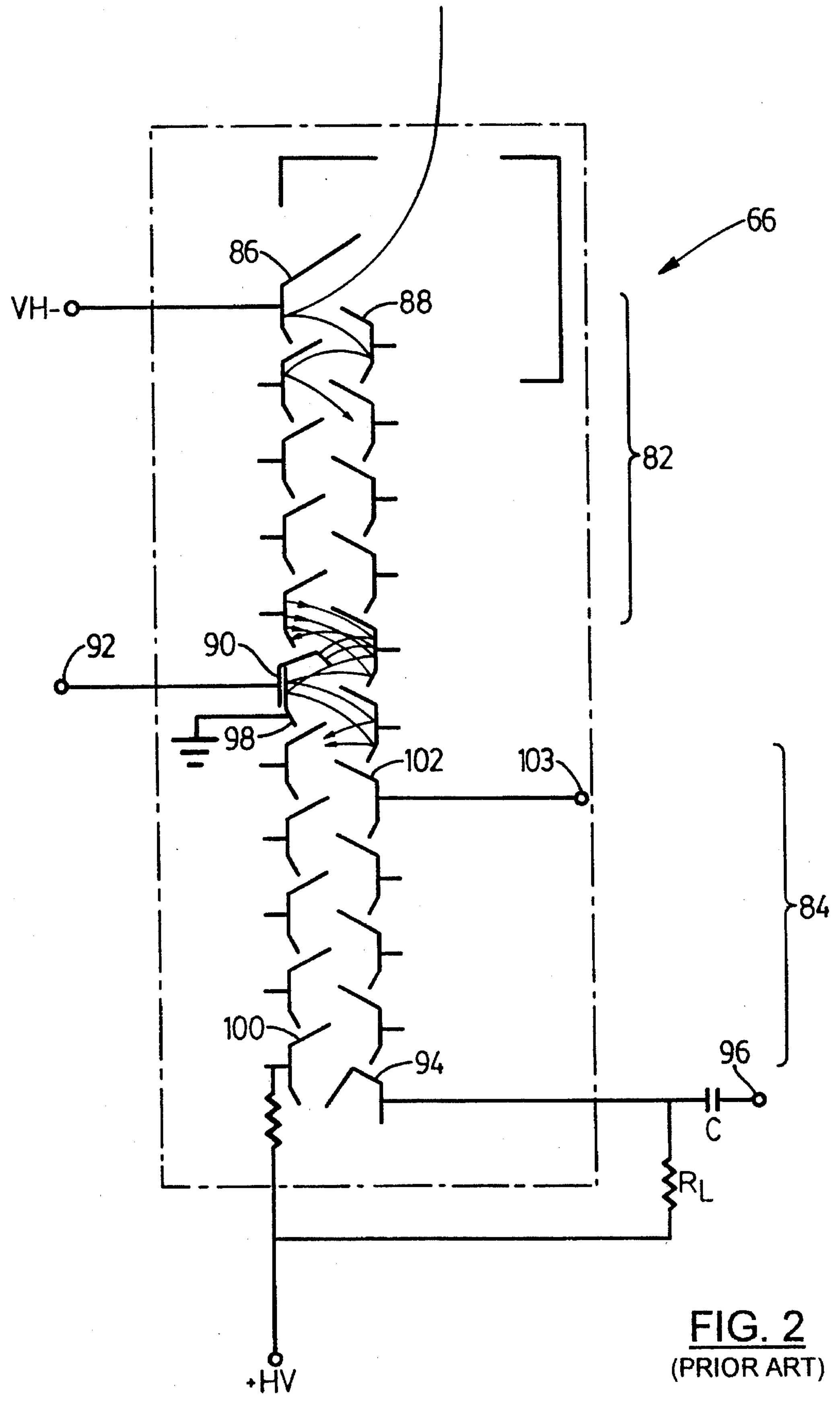
FIG. 2 (PRIOR ART)
FIG. 2 is a diagrammatic view of a known dual mode electron multiplier detector arrangement for use with the system of FIG. 1.

As discussed, the system of the invention uses a dual mode electron multiplier detector 66. A typical such detector, made by ETP Scientific under its model AF 210, is shown at 66 in FIG. 2. The detector 66 contains two dynode stages indicated at 82, 84. Ions incident on the first dynode 86 of stage 82 release electrons which in known manner are attracted to the second dynode 88, causing a further avalanche of electrons, until about half of the resultant electrons reach the analog electrode 90. These produce an analog output current at analog terminal 92. The analog current is processed as will be described.

The remaining electrons continue along and are amplified in the second dynode stage 84 until they reach a pulse count electrode 94. Electrode 94 is coupled by a capacitor C to pulse count terminal 96 for further processing.

A negative high voltage –V is applied to the first dynode 86 of the first dynode stage 82. The first dynode 98 of the second dynode stage 84 (immediately past the analog electrode 90) is grounded, and positive high voltage +V is connected to the last dynode 100. In addition, the third dynode 102 in the second dynode stage is connected to a pulse protect terminal 103 which is normally set at a percentage of +V (for example for the ETP detector) but which can be switched to 0 volts (for the ETP detector) to shut off the flow of electrons through second dynode set 84 when the current becomes too high. A similar arrangement but with different voltages can be used for other detectors, e.g. for the Galileo detector.

ELECTRONICS AND FLAG GENERATION

Figure 3:
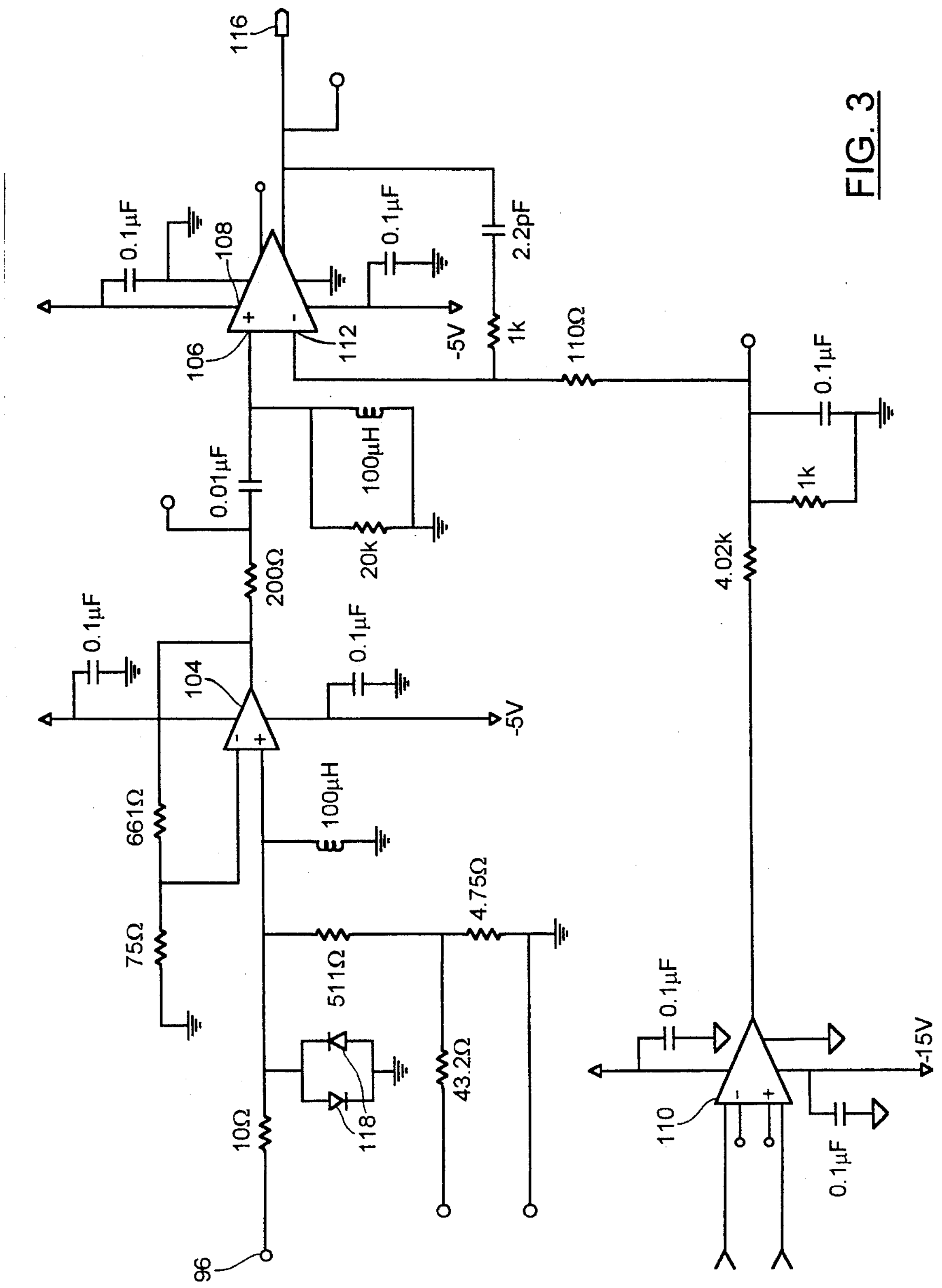
FIG. 3 is a circuit diagram showing a pulse amplifier and discriminator circuit for use with the invention.

Reference is next made to FIG. 3. As shown, the pulse signal at pulse terminal 96 is amplified in amplifier 104 and applied to one input 106 of comparator 108. A user adjustable negative reference voltage (discriminator voltage) supplied by amplifier 110 is applied to the other terminal 112 of comparator 108. When the negative going pulse output signal at pulse amplifier 104 exceeds the negative discriminator voltage, a high pulse appears at comparator output terminal 116. By setting the minimum valid pulse amplitude with the discriminator voltage, the user is able to suppress noise in the system.

Diodes 118 prevent damage if a discharge occurs in the dual mode electron multiplier.

Figure 4:
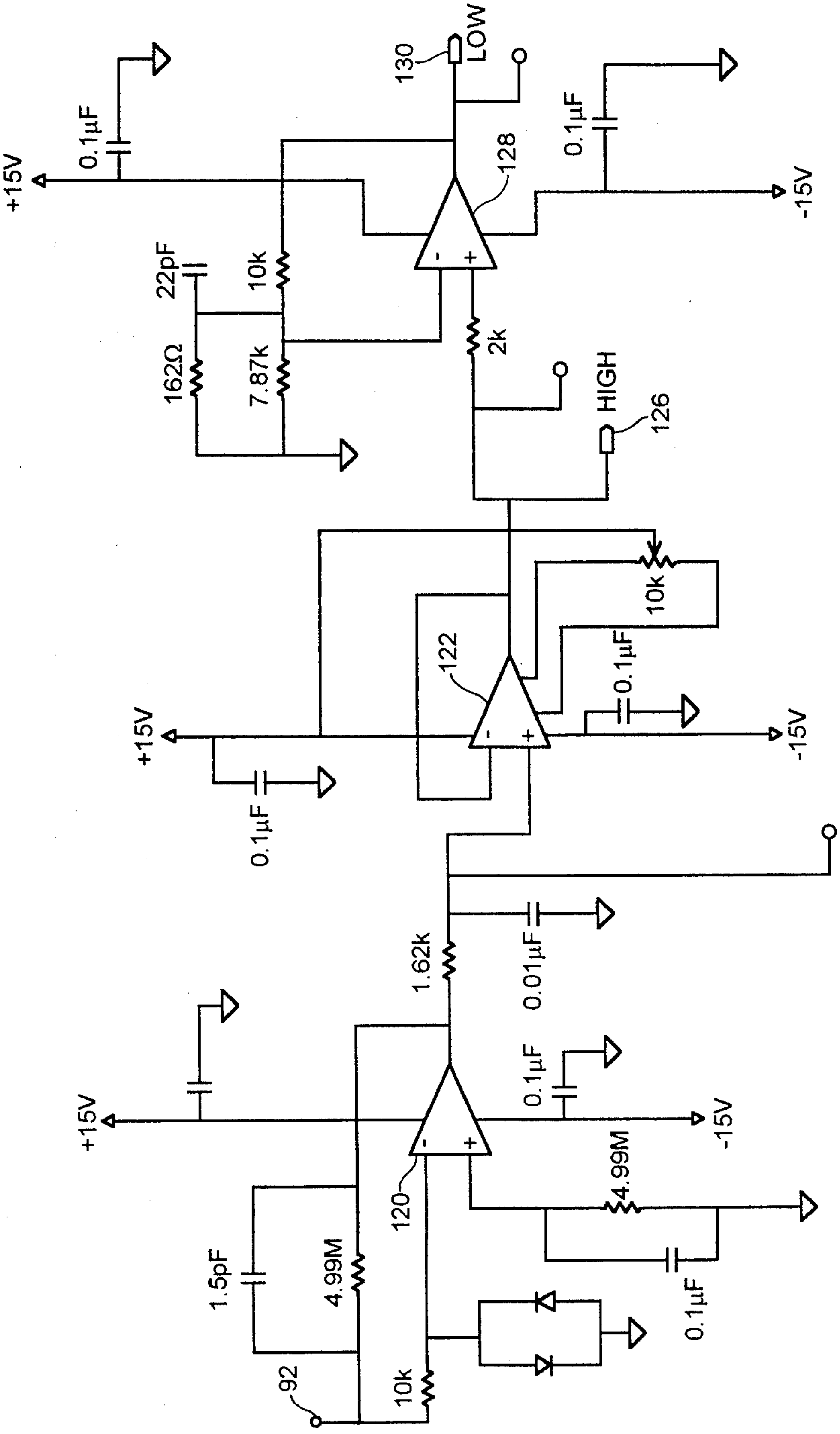
FIG. 4 is a circuit diagram showing an analog signal amplifier for use with the present invention.

As shown in FIG. 4, the analog signal at terminal 92 is amplified in a current to voltage amplifier 120, passes through a unity gain amplifier 122 and then appears at an analog high output terminal 126. In addition, to provide adequate gain when the analog signal is at a very low level, the signal is also applied to amplifier 128 (with a gain of 64 times), the output of which appears at an analog low output terminal 130.

Figure 5:
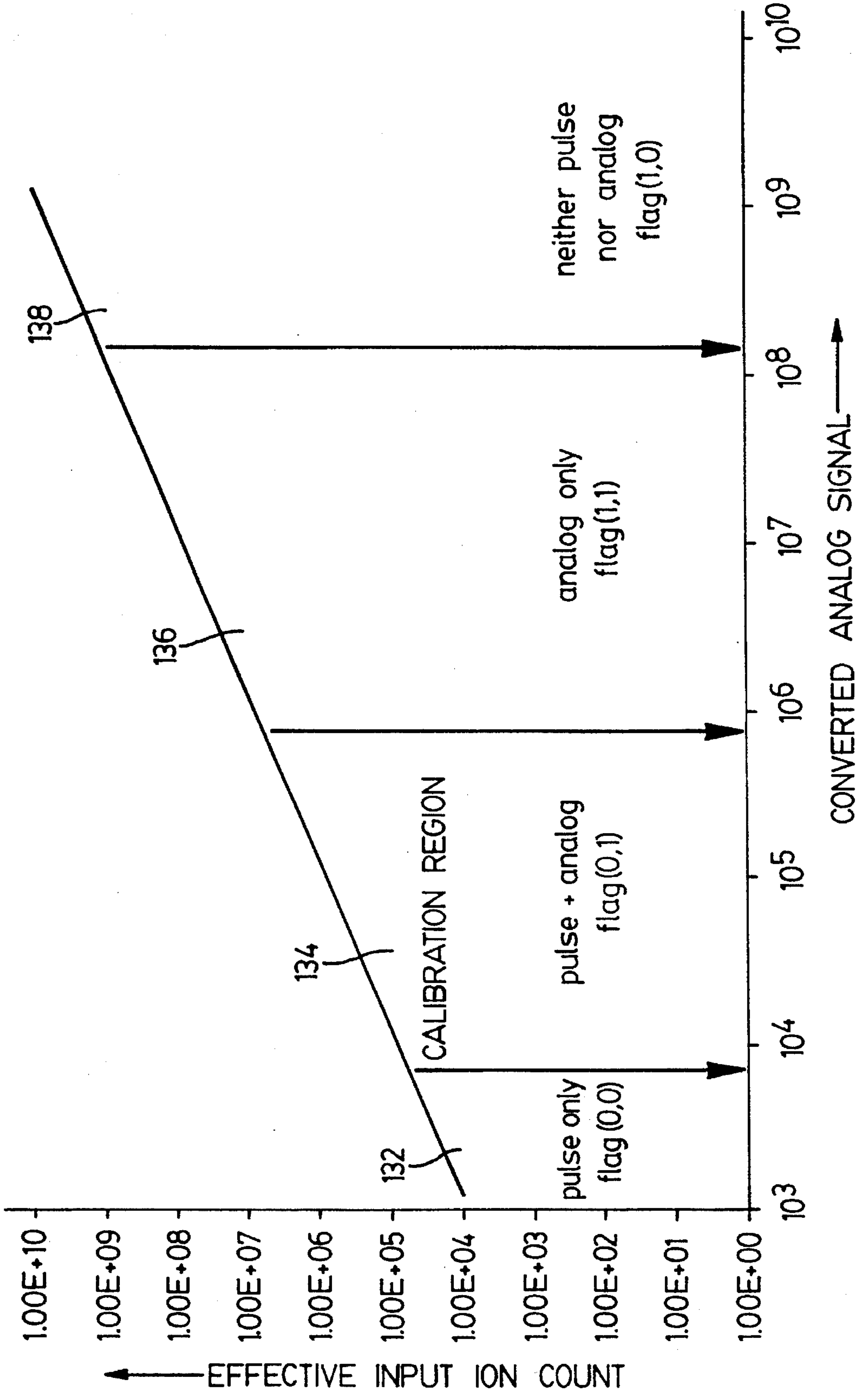
FIG. 5 is a graph displaying ion input counts versus analog signal for the system of FIG. 1.

The pulse and analog signals together will be used to provide an extended dynamic range for the ICP-MS system as shown in FIG. 5. In FIG. 5 the effective ion count signal (counts per second) is plotted on the vertical axis. The horizontal axis shows the analog signal, converted to a frequency as will be explained. FIG. 5 is exemplary since the slope and intercept of the curve will vary with gain, as will be described.

In FIG. 5 four regions are shown. The first region 132 is a pulse only region, in which only the pulse count signal is used (although analog data is also continuously available). In this region the analog signal is either too low to be useful or is less useful than the pulse signal. As shown in the drawing, the pulse only region is marked by a flag (0, 0), as will be explained. The boundary between the region 132 and the next region 134 is empirically set, and in region 132 only pulse count data is arbitrarily considered to be "valid" (although the analog data can still be used, as will be described).

The second region 134 is an overlap region. Here, both the pulse and the analog signals are considered to be valid. Hence this region can be used to calibrate the analog signal to the pulse signal; therefore, this region is also referred to as a calibration region. As will be explained, the overlap or calibration region 134 is marked by a flag (0, 1).

In the third region 136, the analog signal is sufficiently high that the voltage on pulse protect dynode 102 has been switched to 0 volts (for the ETP detector), shutting down the second stage 84 of the multiplier 66. This region is therefore an analog signal only region and is marked by flag (1, 1). Any pulse count data received in this region is clearly invalid.

In the fourth region 138, the analog signal has become so high that a detector protection voltage is applied (as will be explained) to de-focus ion lens 50, reducing the incoming ion flux by a large factor (e.g. 104), to protect the detector 66. This region, referred to as a "neither pulse nor analog" region, is marked by a flag (1, 0). Any pulse or analog data received in this region is also clearly invalid.

Figure 6:
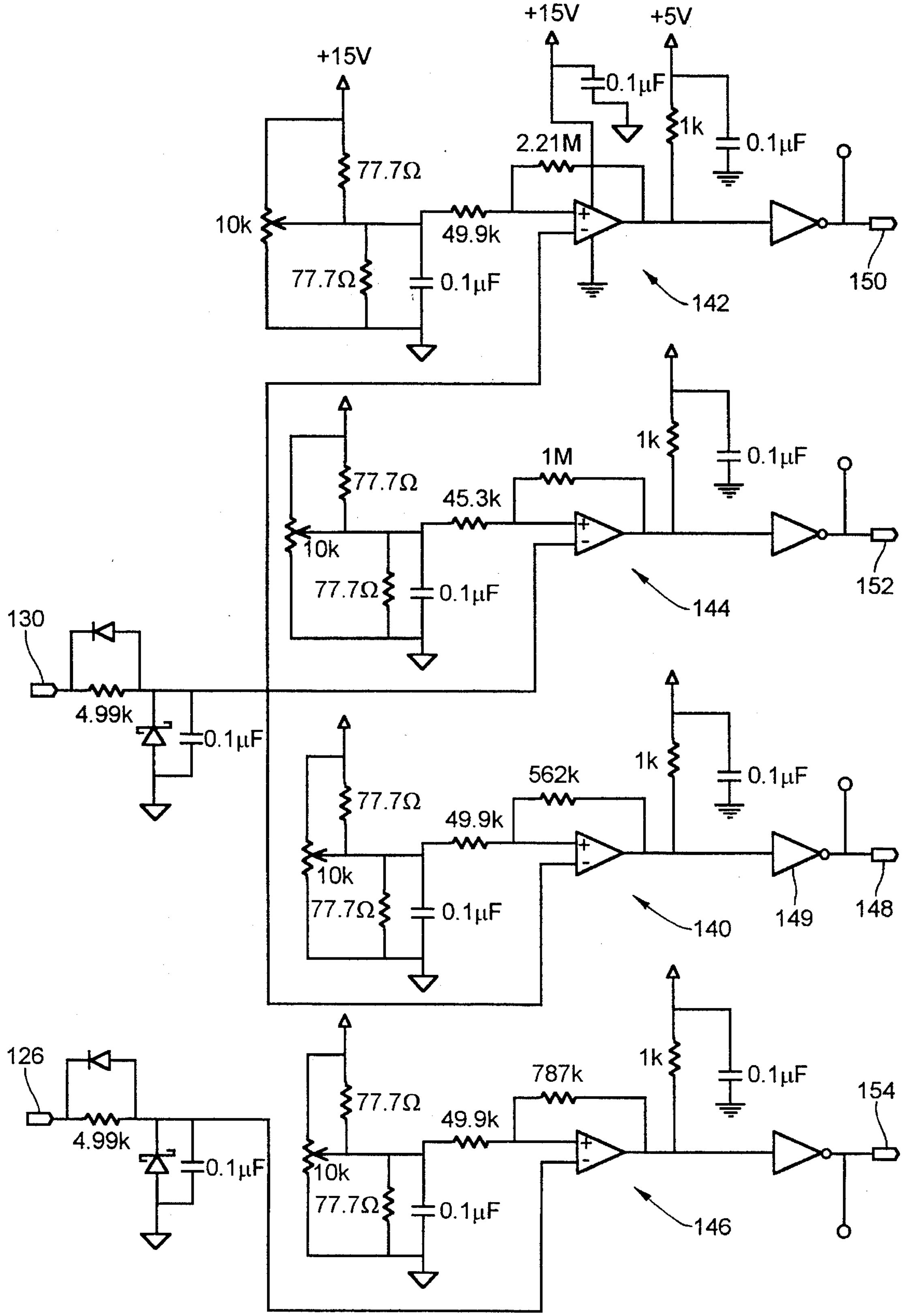
FIG. 6 is a circuit diagram showing comparators for use with the present invention.

The demarcations between the four regions referred to above are determined by three of a set of four comparators shown in FIG. 6. The comparators are a range-up comparator 140, a cross calibrate comparator 142, a pulse protect comparator 144, and a detector protect comparator 146, connected to the analog low and analog high output terminals 130, 126 as shown.

The range-up comparator 140 normally produces a low at terminal 148 (after inversion by inverter 149). However when the analog low voltage at terminal 130 exceeds a preset level (e.g. 9.5 volts), range-up comparator 140 produces a high (e.g. 5 volts) at terminal 148. The voltage level at terminal 148 is used to indicate which of the two analog signals should be used, as will be explained.

The cross calibrate comparator 142 puts out a low at terminal 150 in the pulse only range, when the analog low voltage is below a preset level. When the analog low voltage at terminal 130 exceeds that level (e.g. 0.5 volts), the cross calibrate comparator 142 puts out a high at terminal 150. This indicates to the system that the detector has reached or passed the border between the pulse only region 132 and the overlap region 134, so that the analog signal can be calibrated against the pulse signal.

The pulse protect comparator 144 normally puts out a low at terminal 152 but produces a high when the analog low voltage at terminal 130 exceeds a preset level (e.g. 5 volts). This will be used as mentioned to remove the high voltage from pulse protect terminal 103, defocusing the electrons in the second stage 84 of detector 66, protecting the second stage of the detector.

The detector protect comparator 146 normally puts out a low at terminal 154. However when the analog high voltage at terminal 126 exceeds about 10 volts, comparator 146 then causes a high at terminal 154 which as indicated is used to defocus ion lens 50.

Figure 7:
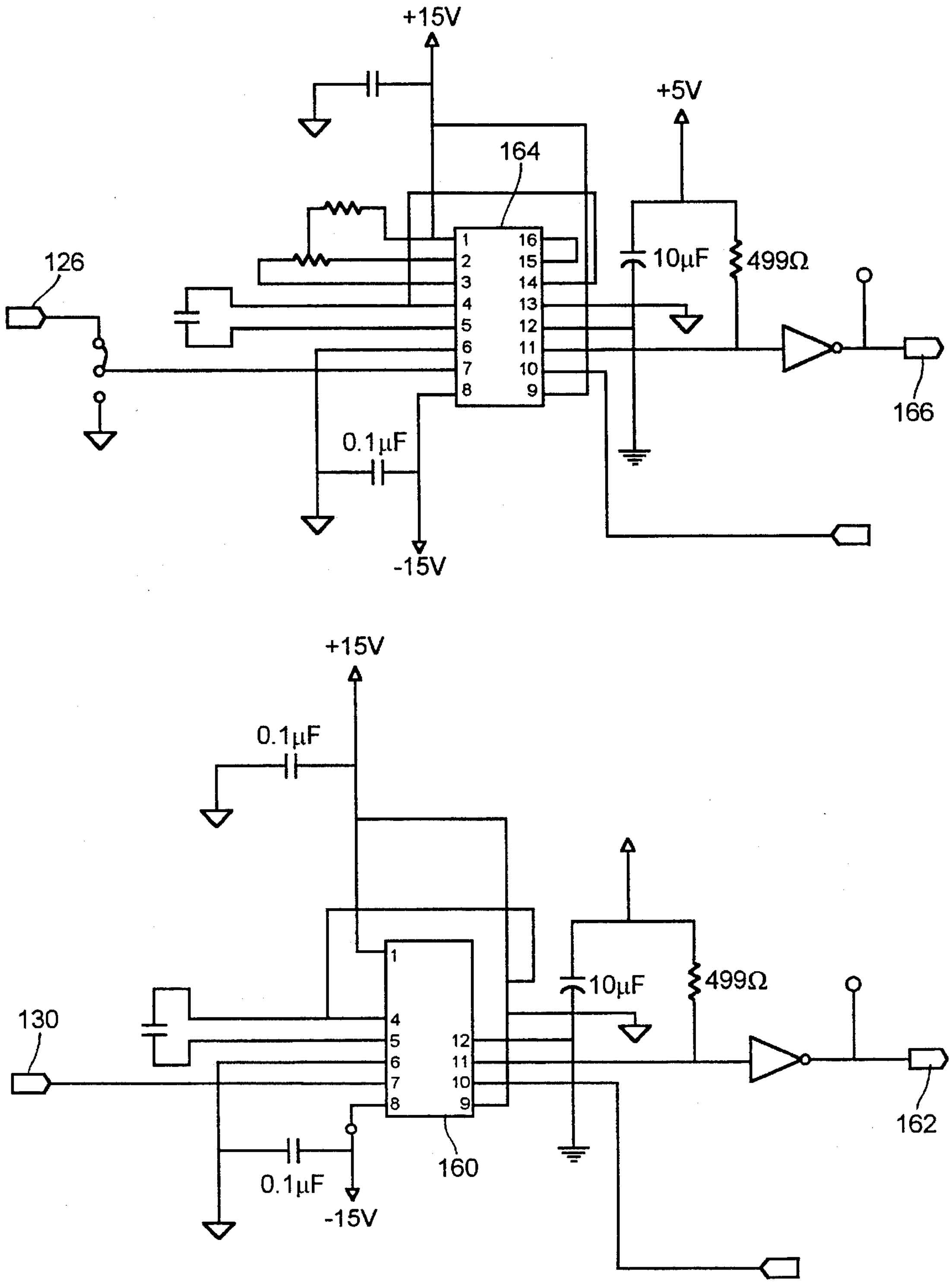
FIG. 7 is a circuit diagram showing voltage to frequency converters for use with the invention.

As shown in FIG. 7, the analog low signal at terminal 130 is directed to a voltage to frequency convertor 160 to convert it to a low range frequency at frequency terminal 162. Similarly the high range analog signal at terminal 126 is directed to another voltage to frequency converter 164 to convert it to a high range frequency at frequency terminal 166.

Figure 8:
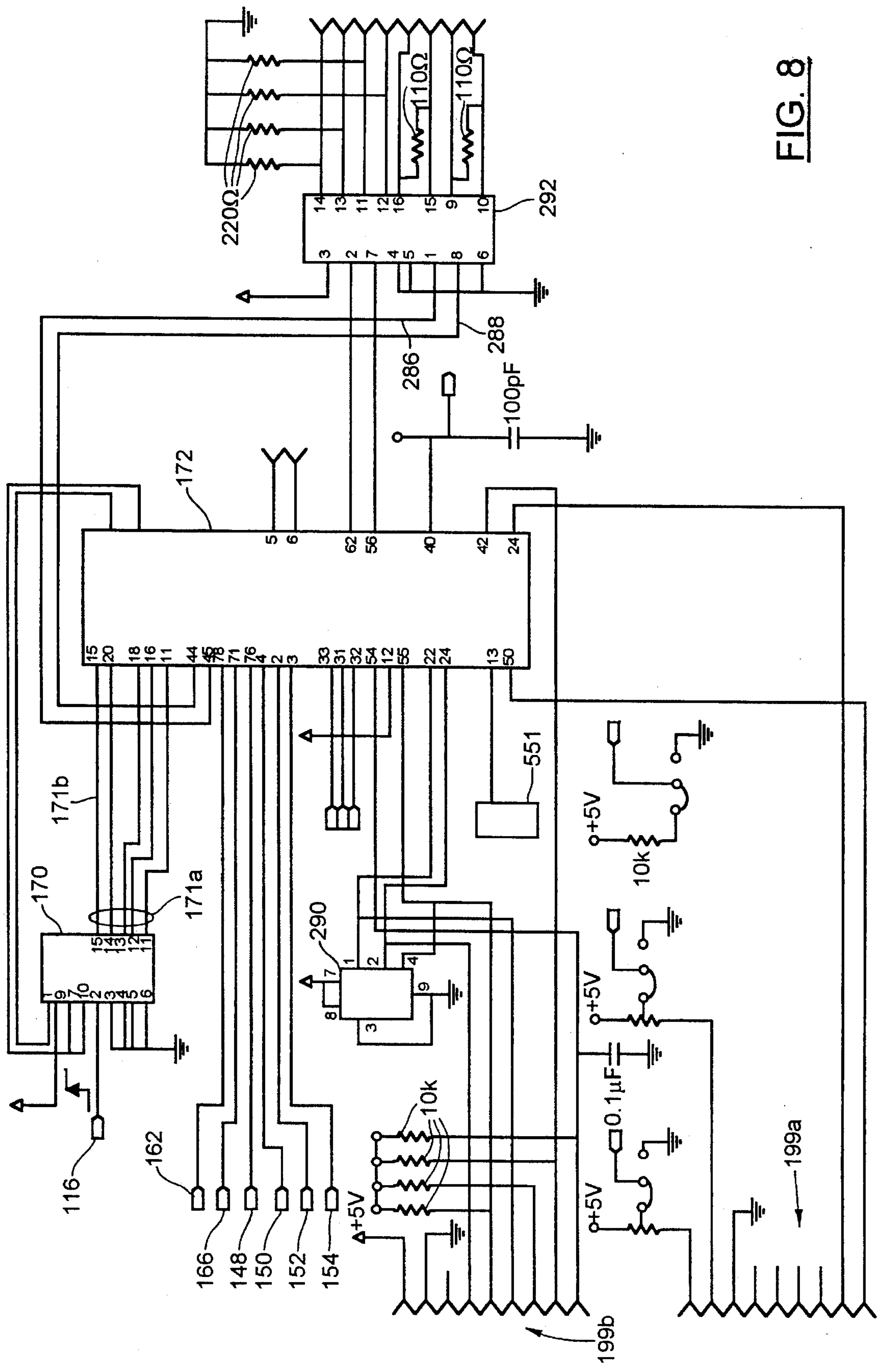
FIG. 8 is a circuit diagram showing microprocessor hardware for use with the circuits of FIGS. 3, 4, 6 and 7.

The various signals described are applied as shown in FIG. 8. As there shown, the pulse count signal from terminal 116 of comparator 108 drives the clock input of a 4-bit synchronous binary counter 170. The 4-bit pulse count is output on bus **171*a*, with an overflow of counter 170 causing a pulse on lead 171*b*. All these bits are applied to inputs of a field programmable gate array chip 172 (e.g. made by XILINX Corp. of San Jose, Calif.). The low range and high range analog signals from frequency terminals 162, 166 are also applied to the gate array chip 172, as are the various comparator signals at terminals 148, 150, 152, 154**.

Figure 9:
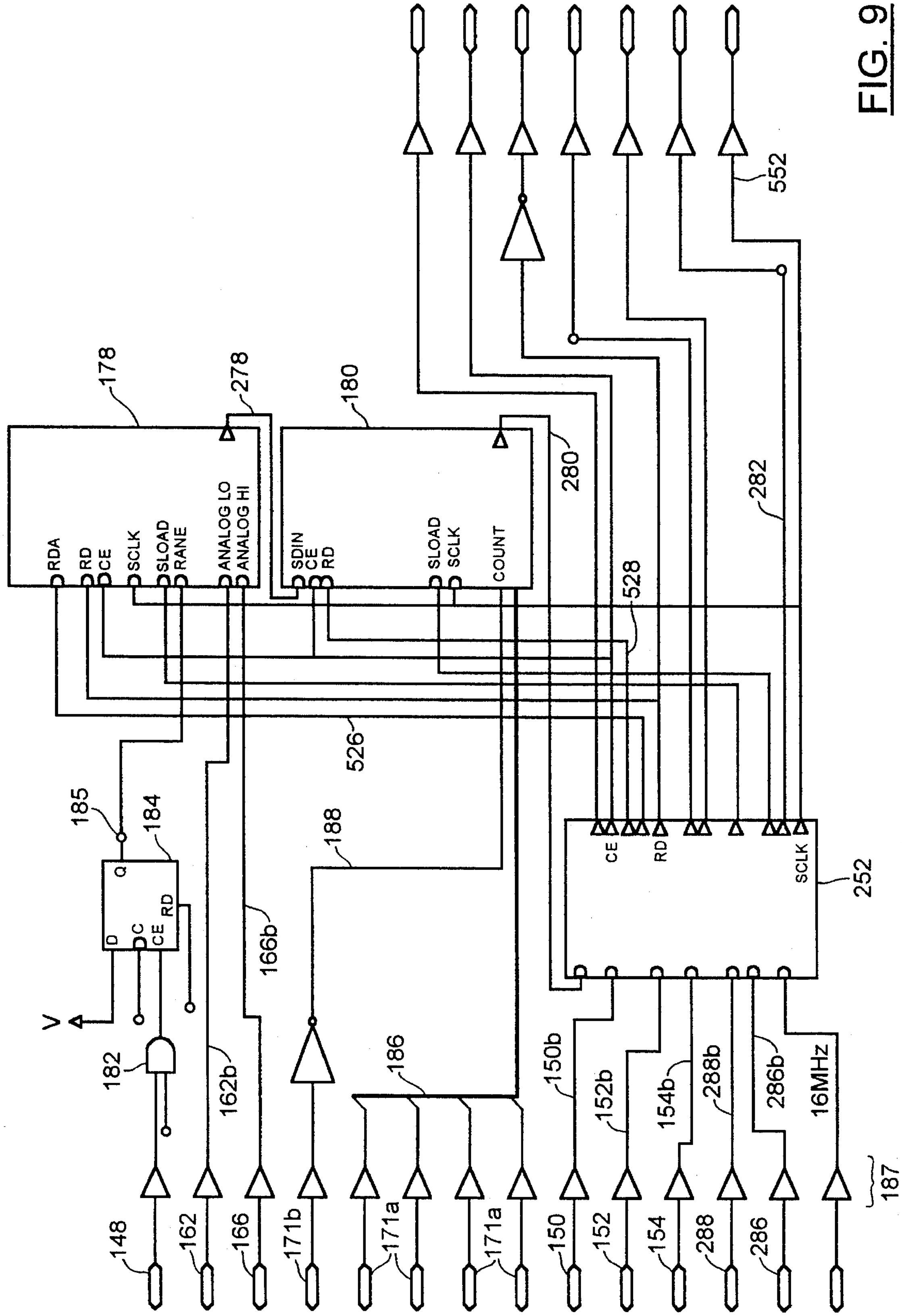
FIG. 9 is a block diagram showing in more detail portions of the FIG. 8 circuit.

The gate array chip 172 contains a number of internal circuits which will now be described. As shown in FIG. 9 chip 172 is programmed to include an analog counter/shifter 178 and a pulse counter/shifter 180. The analog counter/shifter 178 receives the analog low and analog high frequency signals from terminals **162*b*, 166*b* together with a range signal on terminal 185 generated from range up comparator 140. (The input signals in FIG. 9 are applied to buffer amplifiers indicated collectively at 187. The leads at the outputs of the buffer amplifiers have the same reference numerals as the inputs but with the suffix "b".) The value at terminal 148 is the input of latch 184 when the count enable signal CE on AND gate 182 is high. The output of latch 184 at terminal 185 is applied to analog counter/shifter 178**.

The pulse counter/shifter 180 receives, on bus 186, the first four bits of the accumulated pulse count on bus **171*a*. It also receives on lead 188 generated by 171*b* a signal indicating that the counter 170** has overflowed.

Figure 10:
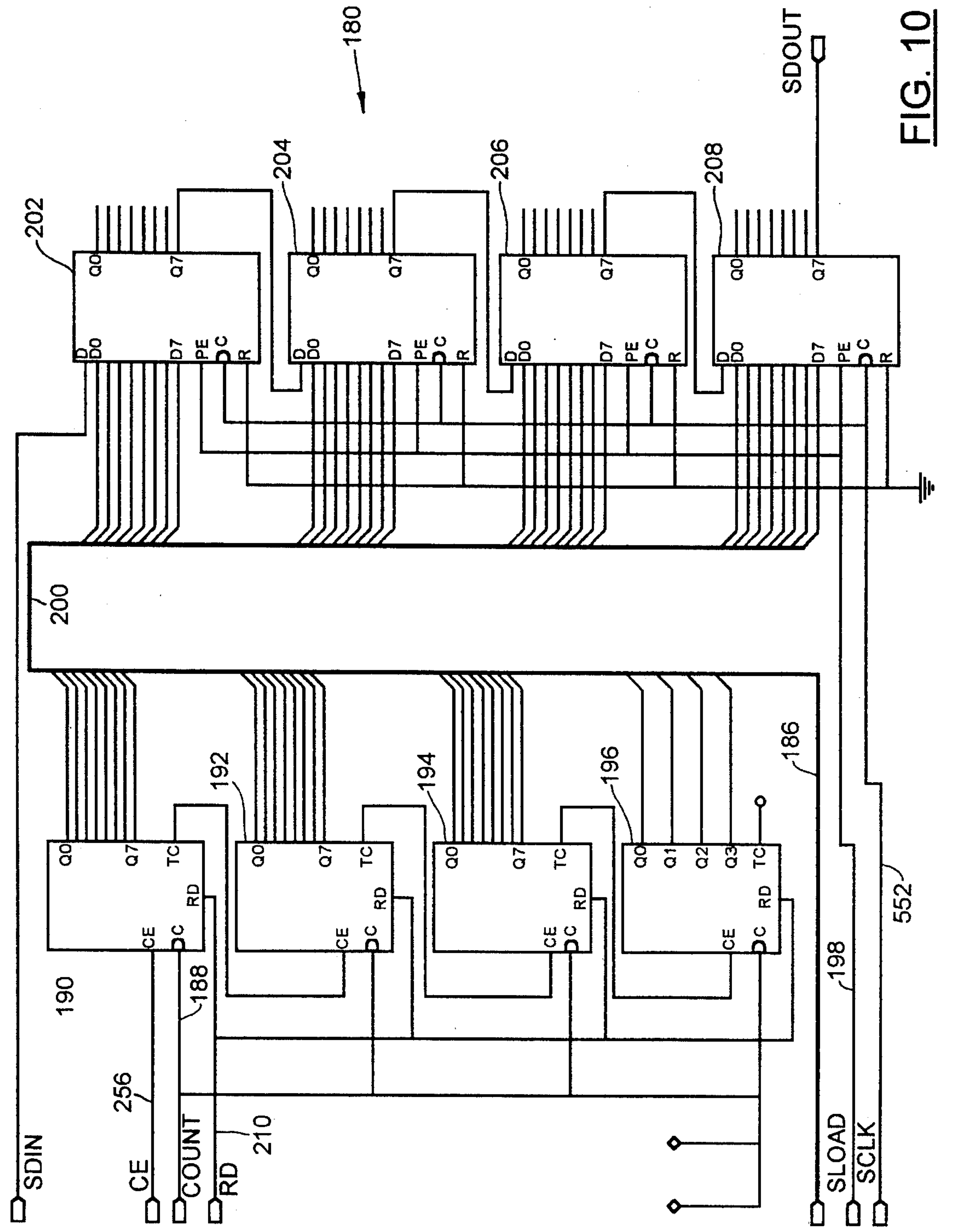
FIG. 10 shows details of the pulse counter/shifter logic from FIG. 9.

The details of the pulse counter/shifter portion of the chip 180 are shown in FIG. 10. As shown, the pulses on lead 188 (i.e. the pulse count signal divided by 16) drive the clock input of counters 190 to 196. The first four bits (0 to 3) were produced by the counter 170.

As is conventional, during one type of mass spectrum scan the system controller 70 steps the RF and DC voltages in the mass analyzer and causes those voltages to pause or dwell at successive preset values, so that the intensity of the ion flux can be read at each set of values. During each dwell, and after a settling time long enough to allow the signal to settle after the beginning of the dwell, the counters 190 to 196 successively accumulate bits from 4 to 31 of the pulse count signal.

At the end of the dwell, the system controller 70 ends the counting, by indirectly driving the CE line 256 low. An external signal provided by system controller 70 results in a signal being generated on SLOAD line 198 which then causes the data in the counters 190 to 196, as well as the first four bits 0 to 3 from counter 170, to be shifted in parallel on bus 200 to a set of shift registers 202 to 208. The counters 190 to 196 and external counter. 170 are then cleared by a reset signal on reset direct line 210 so that they can accumulate pulse count bits during the next dwell.

At the same time, the analog counter/shifter 178 counts pulses generated by the voltage to frequency converters 160, 164. The analog counter/shifter 178 includes a prescaler 214 (FIG. 11) and a set of counters 216 to 222 and registers 224 to 230 (FIG. 12).

The analog prescaler 214 includes a pair of counters 232, 234. The analog low frequency signal from terminal 162 drives the clock input of counters 232, 234 which provides bits 0 to 5 (six bits) from the outputs of counters 232, 234. Provided that the range signal at terminal 185 remained low for the entire dwell, the output of counters 232 and 234 appear at the outputs of the 4-input 2-output multiplexers 238, 240, 242. Otherwise 0's appear at the outputs of these multiplexers.

The analog high frequency signal from terminal 166 is anded in AND gate 244 with the range signal from latch 184. The output from AND gate 244 is directed through OR gate 246, the other input of which is received from a NOR gate 248. The inputs to NOR gate 248 are the range signal from latch 184 and bit 6 of the analog count generated by counter 234. OR gate 246 therefore produces at terminal 250 a clock signal which is either the analog high frequency signal or the highest bit of the six bit counters 232, 234. The range signal at terminal 185 determines which of these two signals, analog high or the sixth bit from counter 234, will be the clock signal at terminal 250.

Figure 11:
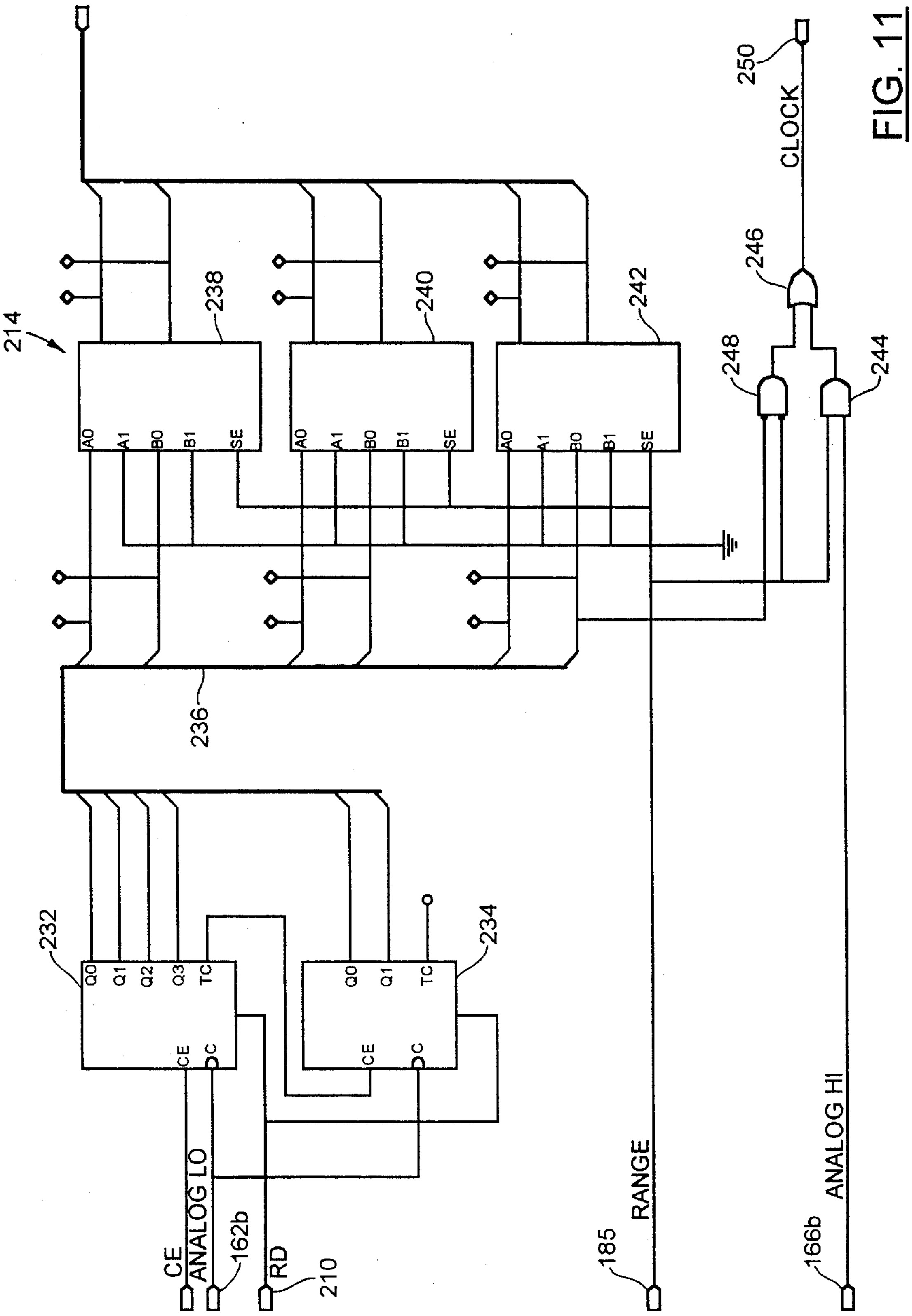
FIG. 11 shows details of the analog counter/shifter prescaler logic from FIG. 12.
Figure 12:
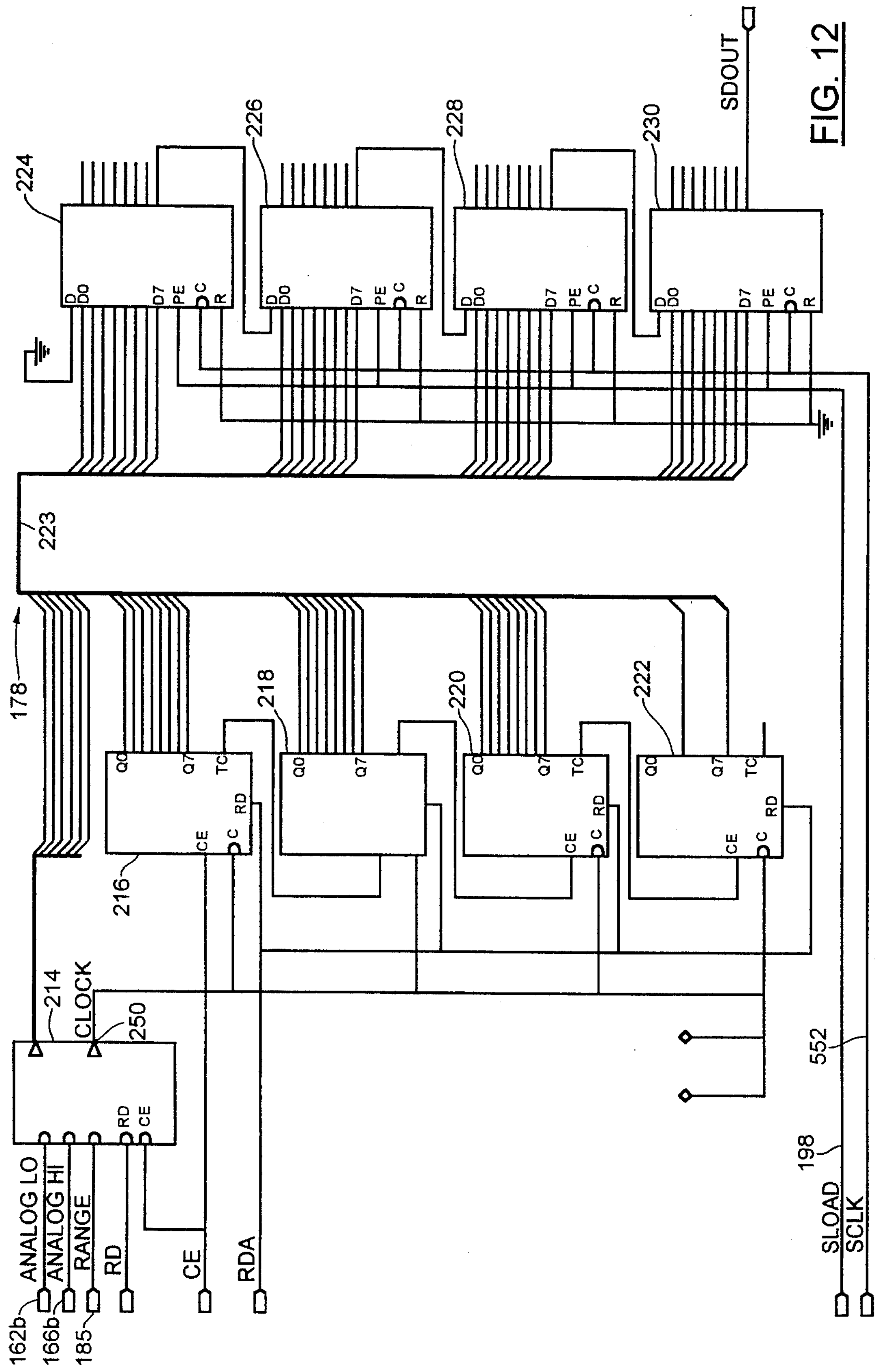
FIG. 12 shows analog counters/shifters and registers from FIG. 9.

As shown in FIG. 12, the clock signal from terminal 250 drives the clock inputs of counters 216 to 222 of the analog counter/shifter 178 thus generating bits 6 to 31. The first six bits 0 to 5 are provided from the 4 to 2 multiplexers 238 to 242 of the analog prescaler 214 (FIG. 11). Thus, a 32 bit value is accumulated to represent the analog signal from the detector 66. At the end of the dwell, this value is parallelly loaded into shift registers 224 to 230 via bus 223 (FIG. 12) and the counters 216 to 222 and 232, 234 are then cleared in the same manner as the pulse counter/shifter block.

Figure 13:
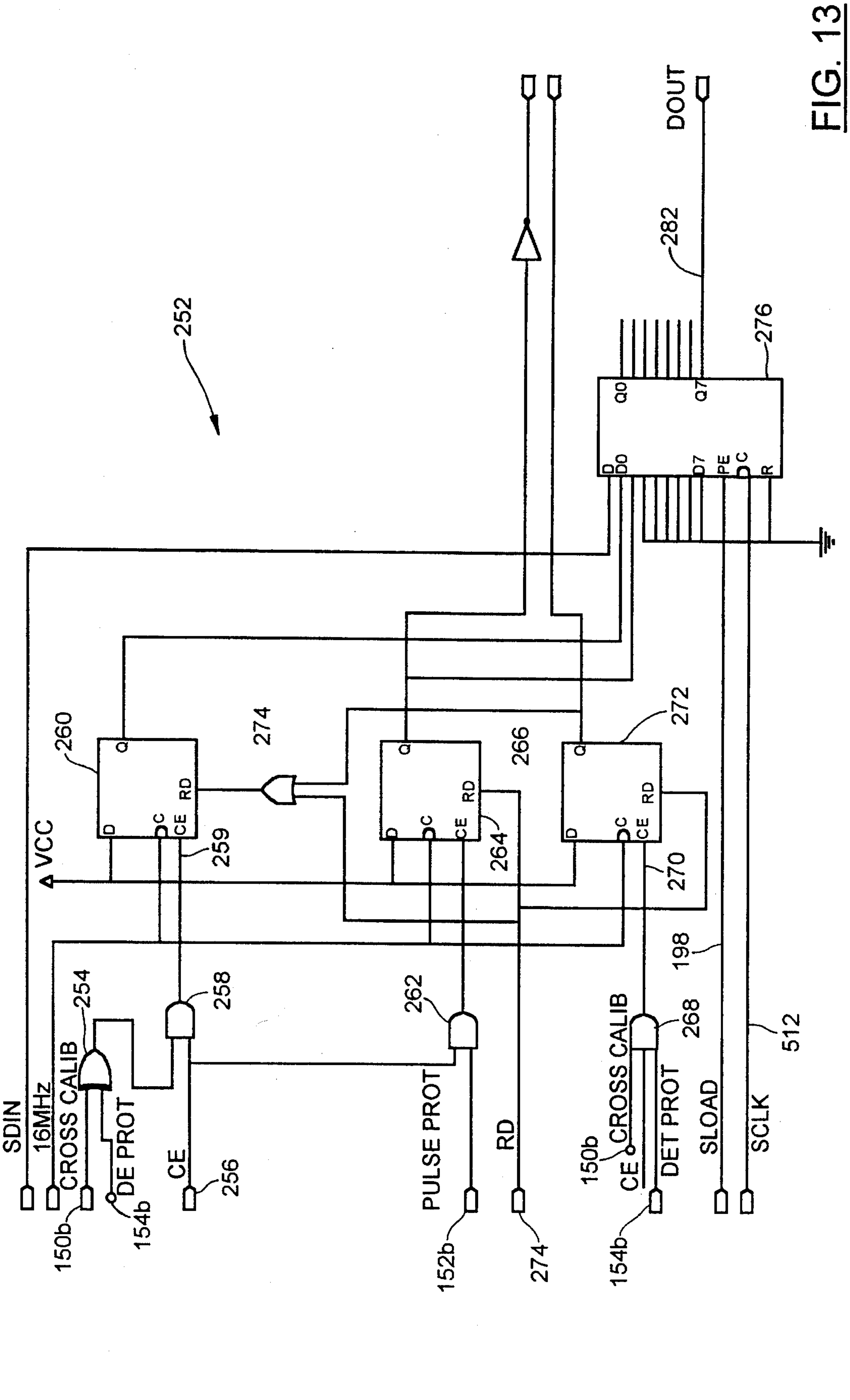
FIG. 13 shows a circuit for producing control byte flags.

Thus, at the end of each dwell, two sets of data have been created and loaded in registers, namely pulse count data and analog data. In addition a control byte or flags are also created, as shown in the control byte formatting circuit (or flag module) 252 of FIG. 13. As there shown, the output from lead 150*b* from the cross calibrate comparator and lead 154*b* from the detector protect comparator are applied to EXCLUSIVE OR gate 254. The output of gate 254 together with count enable signal from terminal 256 are directed through AND gate 258 to count enable input 259 of flip-flop 260. The pulse protect signal from lead 152*b* is directed through AND gate 262 to the count enable terminal 264 of a second flip-flop 266, while the detector protect signal and cross calibrate signal from leads 154*b*, 150*b* are (with a count enable signal) directed through AND gate 268 to the count enable terminal 270 of flip-flop 272. The flip-flops 260, 266, 272 are reset from a reset direct terminal 274 and in addition flip-flop 260 can be reset through OR gate 274 when the output of flip-flop 272 goes high.

As shown, the output terminals of flip-flops 260, 266 are connected to a register 276 which stores the two bit code forming the flags previously mentioned, to indicate whether the detector 66 is in the pulse only region, the overlap region, the analog only region or the neither pulse nor analog region.

As will be seen, in the pulse only region 132 there is a low cross calibrate signal and a low detector protect signal, so the output from EXCLUSIVE OR gate 254 is low and the output of flip-flop 260 (the first bit of the flag) is 0. In addition since there is no pulse protect signal the output of flip-flop 266 is also 0, so that the second bit of the flag is 0. These values (0,0) are stored in register 276 at the end of the dwell.

In the overlap region 134, there is a high cross calibrate signal and a low detector protect signal, so the output of flip-flop 260 is a 1 provided that CE went high. Since there is a low pulse protect signal, the output of flip-flop 266 is 0, so that the flag for this region is (0, 1), which is stored in register 276 at the end of the dwell.

In the analog only region 136 there is a high cross calibrate signal but a low detector protect signal, so the output from gate 254 is high. Of course flip-flop 260 has already been set so that its output remains high, inputting a 1 into register 276. In addition, since there is a high pulse protect signal, the output of flip-flop 266 is also high, producing a (1, 1) flag for the first two bits of register 276 provided CE went high.

In the neither pulse nor analog region 138, both cross calibrate and detector protect signals are high at AND gate 268. The output of flip-flop 272 then goes high, provided CE went high, resetting flip-flop 260. At the same time, since there is a pulse protect signal at gate 262 and provided CE went high, the output of flip-flop 266 is high, producing the required (1, 0) flag at register 276. It will be seen that since the detector protect signal cannot occur without a cross calibration signal already having occurred, it is possible to represent the four regions 132 to 138 by a two bit code or flag in a relatively simple manner.

At the end of the dwell, therefore, 32 bits of analog data, 32 bits of pulse count data, and two bits of flag data have been loaded in registers in the circuit blocks 178, 180, 252 (FIG. 9). At the end of the dwell this data is shifted serially out from the analog counter/shifter 178 to the pulse counter/shifter 180 on serial data line 278, from the pulse counter/shifter 180 to the flag module 252 on serial data line 280, and then to the system controller 70 along serial data line 282.

As shown in FIGS. 8, 9, settling and capture count lines 286, 288 from the system controller 70 are also provided, as is conventional. The signal on the settling line 286 is used to disable and reset the counters and flag flip-flops to permit the system to settle after it moves from one point or dwell in the scan to the next, before counting begins. The settling time can be specified by the user or fixed in software. The capture count line 288 carries a capture count signal from the system controller 70. The rising edge of the capture count signal indicates the end of the counting period or dwell, after the system has begun counting, and starts the process of parallel loading of registers, clearing of counters, flip-flops, and the process of serially uploading data to the system controller. Counting and flag generation then begin in the next dwell provided that there is also a low on the settling line 286.

In FIG. 8 chip 290 simply loads a configuration program into blank chip 172 on power-up. The configuration program contains all the logic represented in FIGS. 9 through 13.

Circuit 292 is a transmitter/receiver chip to interface between the system controller 70 and the gate array chip 172 and to improve noise immunity. The SLOAD line 198 performs the same functions for analog counter/shifter module 178 and flag module 252 as described for pulse counter/shifter module 180. Leads 199*a* and 199*b* are used to put chip 172 into different modes simply for testing purposes.

Figure 9A:
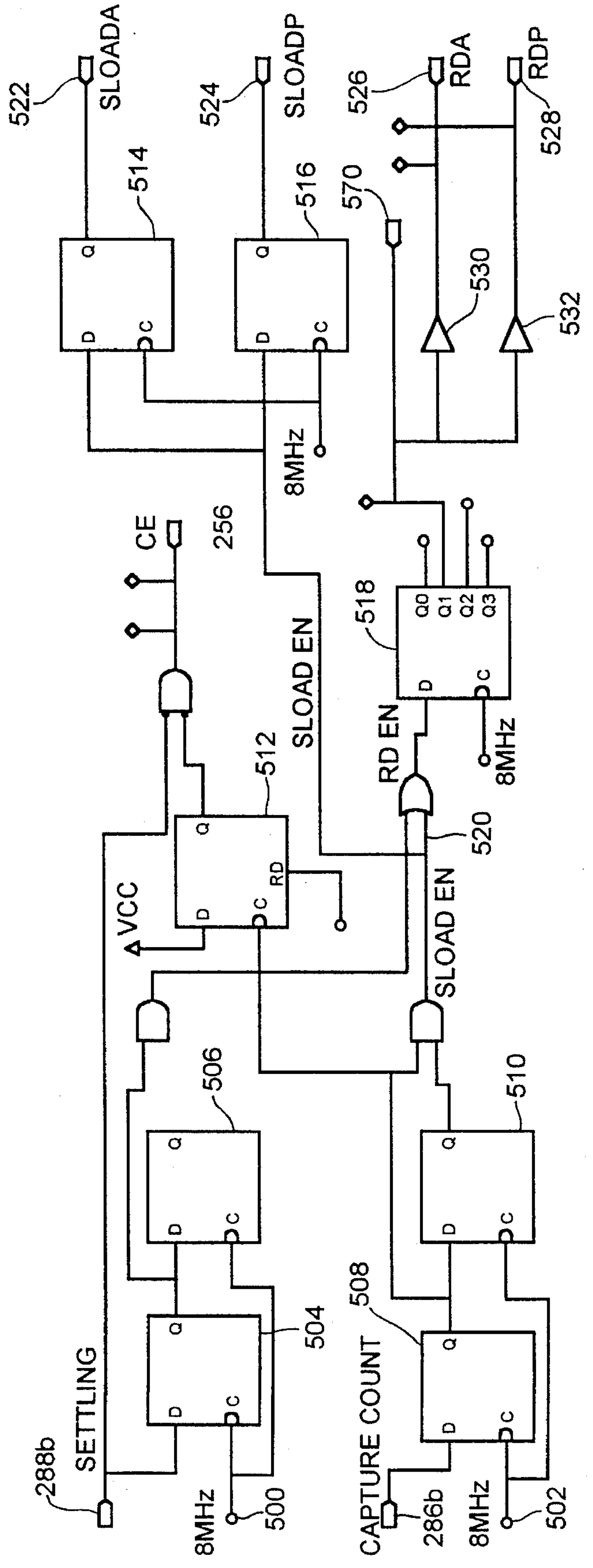
FIGS. 9A and 9B show details of timing control logic from FIG. 9.
Figure 9B:
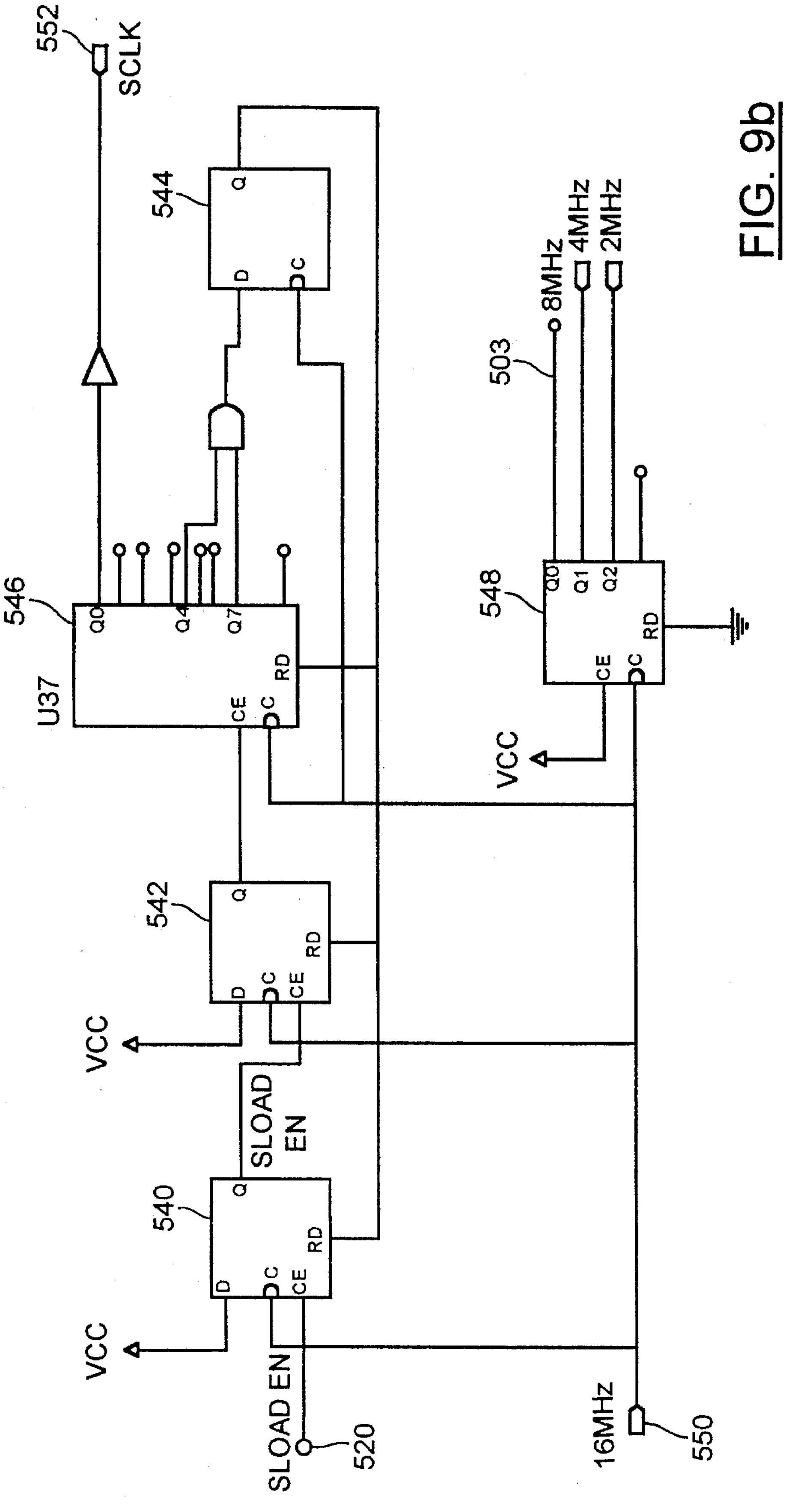
Figures 9C, 9D:
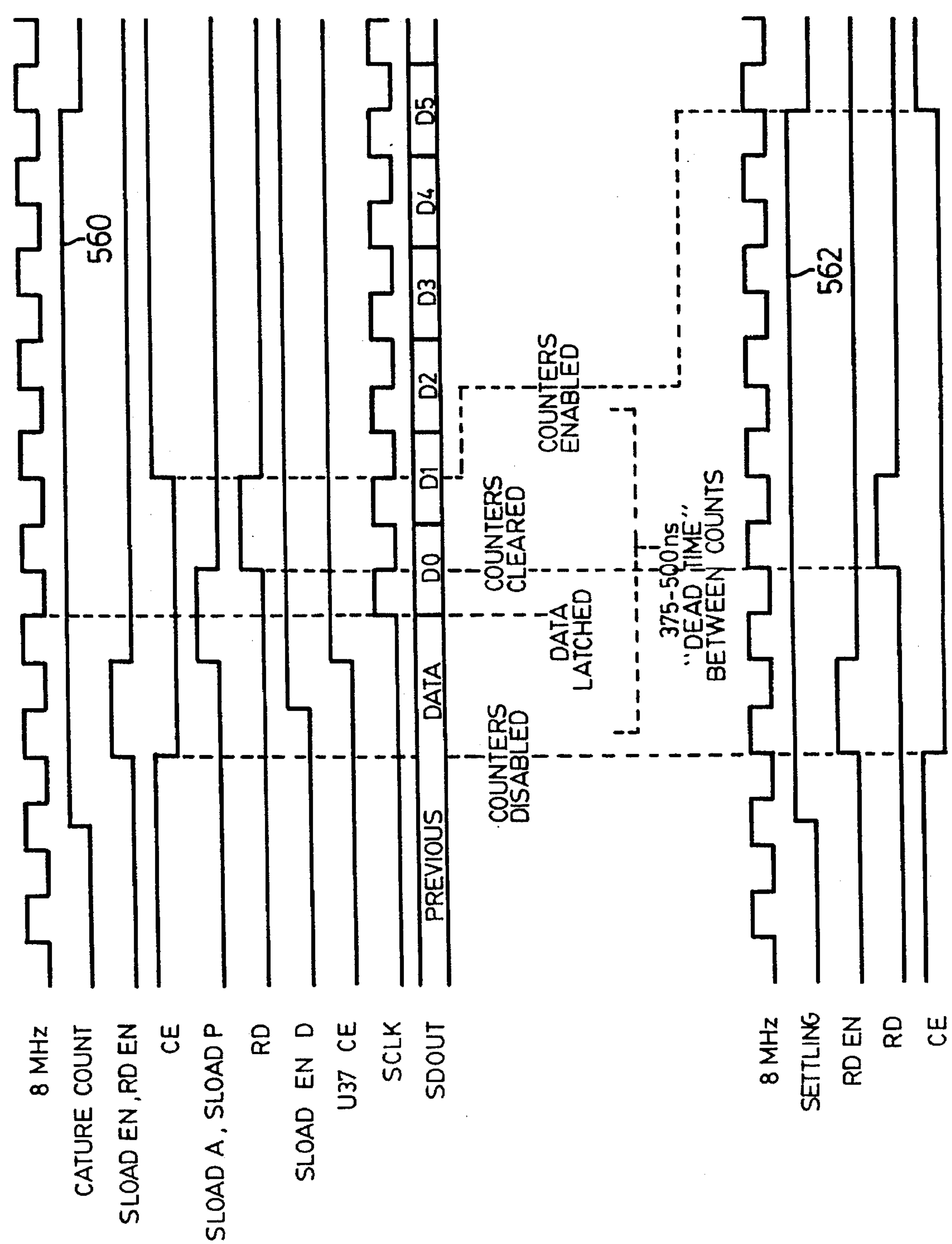
FIGS. 9C and 9D show relative timing of signals identified in FIGS. 9A and 9B.

For completeness, reference is next made to FIGS. 9A and 9B which show the logic used to control the timing of data flow within chip 172, and to FIG. 9C and 9D which show the relative timing of the signals produced. As shown, the input to the FIG. 9A circuit are the settling and capture count signals from the system controller, on leads 288B, 286B respectively, and an 8 megahertz signal on leads 500, 502 (from lead 503 in FIG. 9B). These signals are processed through flip flops 504 to 516, gates as shown, and a shift register 518 to produce the following signals: CE (clock enable) on lead 256, SLOAD EN (serial load enable) on lead 520, SLOAD A (serial load analog) on lead 522, SLOAD P (serial load pulse) on lead 524, RDA (reset direct analog) on lead 526, RDP (reset direct pulse) on lead 528 (signals RDA and RDP are the same but are separately produced through buffer amplifiers 530, 532 because of the heavy load requirements for these signals).

As shown in FIG. 9B, the signal SLOAD EN is processed through flip flops 540 to 544, counters 546, 548, and gates as shown, together with a 16 megahertz signal on lead 550 (from an oscillator 551, FIG. 8), to produce the signal SCLK (serial clock) on lead 552.

The relative timing of the various signals is shown in FIGS. 9C and 9D. FIG. 9C shows the timing relationships as determined by the capture count signal 560 (on lead 286*b*), while FIG. 9D shows the timing relationships as determined by the settling signal 562 (on lead 288B). In FIG. 9D the signal SLOAD END appears at the output of flip flop 540, while the signal U37-CE appears at the output of flip flop 542. The signal SDOUT (serial data out) represents the serial shifting of the previous data out to the system controller.

In FIG. 9D the signal RD EN is shown as one of the inputs to shift register 518, while signal RD (reset direct) appears at terminal 570 (and is split as mentioned by amplifiers 530, 532 into signals RDA, RDP).

Signal CE (count enable) is used as discussed to enable and disable the pulse and analog counters and the control bit latches. Signals SLOAD A and SLOAD P (referred to as SLOAD on leads 178, 180 and 252*a*) are used to control whether the shift registers are in parallel or serial shift mode.

Signals RDA and RDP are used to synchronously reset counters and flip flops within chip 172.

Signal SCLK is used to synchronously clock the 72 bits of the pulse, analog and flag data to the system controller.

Counter 548 is used to generate an 8 megahertz and 4 megahertz clock from the 16 megahertz oscillator 551 (which signal is buffered inside chip 172).

USE OF FLAGS

The pulse and analog signals, together with the flags, are all now stored in the system controller 70 software. A representation of typical data so stored is displayed in Table 1 below. Table 1 shows data obtained from a 50 part per million (ppm) solution by weight containing magnesium (23.985 g per mole), indium (114,904 g per mole), and uranium (238.052 g per mole) which was introduced into the ICP-MS system 10. (The entry in Table 1 for mass 117.904 is simply to indicate a mass location where no element was present, to show the background signal.) The ion beam was attenuated (by defocusing the beam prior to entering the mass analyzer 64) in a nonlinear but predictable manner by applying a range of voltages on lens 50, from −17 volts to 17 volts in 2 volt increments.

It can be seen from Table 1 that the signal level of Mg was such that it ramped through the three flagged regions of (0,0), (0,1) and (1,1), while the signal intensities of In and U became sufficiently large that they also entered the region (1,0). At mass 117.904 where no element was present, the flags remained (0,0) throughout.

In Table 1, the values of 5.0×106 and $1.28\times10^{8}$ refer to cutoff values for pulse counting and analog, respectively.

The data so obtained can be used to optimize and calibrate the detector system 66, to diagnose system errors, and to permit storage and further manipulation of the data, as will be discussed below.

TABLE 1

| Mg | | | | In | | | |
|---|---|---|---|---|---|---|---|
| mass<br>Lens volts | 23.985<br>Pulse | Analog | Flags | mass<br>Lens volts | 114.904<br>Pulse | Analog | Flags |
| −17 | 1418 | 494 | 0,0 | −17 | 129 | 172 | 0,0 |
| −15 | 3201 | 943 | 0,0 | −15 | 478 | 227 | 0,0 |
| −13 | 8073 | 2117 | 0,0 | −13 | 2476 | 577 | 0,0 |
| −11 | 19682 | 4953 | 0,1 | −11 | 16252 | 2971 | 0,1 |
| −9 | 44392 | 10946 | 0,1 | −9 | 86097 | 15486 | 0,1 |
| −7 | 98531 | 24750 | 0,1 | −7 | 5.00E + 06 | 70666 | 1,1 |
| −5 | 5.00E + 06 | 76681 | 1,1 | −5 | 5.00E + 06 | 197376 | 1,1 |
| −3 | 5.00E + 06 | 324224 | 1,1 | −3 | 5.00E + 06 | 480128 | 1,1 |
| −1 | 5.00E + 06 | 554432 | 1,1 | −1 | 5.00E + 06 | 1.78E + 06 | 1,1 |
| 1 | 5.00E + 06 | 938496 | 1,1 | 1 | 5.00E + 06 | 4.20E + 06 | 1,1 |
| 3 | 5.00E + 06 | 1.28E + 06 | 1,1 | 3 | 5.00E + 06 | 5.01E + 06 | 1,1 |
| 5 | 5.00E + 06 | 4.24E + 06 | 1,1 | 5 | 5.00E + 06 | 1.28E + 08 | 1,0 |
| 7 | 5.00E + 06 | 65192 | 1,1 | 7 | 5.00E + 06 | 1.28E + 08 | 1,0 |
| 9 | 1700 | 1212 | 0,0 | 9 | 5.00E + 06 | 3.89E + 06 | 1,1 |
| 11 | 120 | 736 | 0,0 | 11 | 5.00E + 06 | 133312 | 1,1 |
| 13 | 75 | 495 | 0,0 | 13 | 11339 | 2513 | 0,0 |
| 15 | 23 | 213 | 0,0 | 15 | 202 | 204 | 0,0 |
| 17 | 24 | 160 | 0,0 | 17 | 79 | 166 | 0,0 |

TABLE 1-continued

| mass Lens volts | 117.904 Pulse | Analog | Flags | U mass Lens volts | 238.052 Pulse | Analog | Flags |
|---|---|---|---|---|---|---|---|
| −17 | 4 | 147 | 0,0 | −17 | 172 | 176 | 0,0 |
| −15 | 5 | 146 | 0,0 | −13 | 744 | 256 | 0,0 |
| −13 | 2 | 146 | 0,0 | −11 | 3178 | 639 | 0,0 |
| −11 | 2 | 150 | 0,0 | −9 | 22342 | 3658 | 0,0 |
| −9 | 3 | 147 | 0,0 | −7 | 164257 | 27961 | 0,1 |
| −7 | 2 | 144 | 0,0 | −5 | 5.00E + 06 | 164288 | 1,1 |
| −5 | 22 | 151 | 0,0 | −3 | 5.00E + 06 | 446272 | 1,1 |
| −3 | 59 | 161 | 0,0 | −1 | 5.00E + 06 | 1.15E + 06 | 1,1 |
| −1 | 149 | 188 | 0,0 | 1 | 5.00E + 06 | 4.69E + 06 | 1,1 |
| 1 | 301 | 282 | 0,0 | 3 | 5.00E + 06 | 1.28E + 08 | 1,0 |
| 3 | 370 | 355 | 0,0 | 5 | 5.00E + 06 | 1.08E + 07 | 1,1 |
| 5 | 1542 | 837 | 0,0 | 7 | 5.00E + 06 | 1.28E + 08 | 1,0 |
| 7 | 458 | 591 | 0,0 | 9 | 5.00E + 06 | 3.28E + 06 | 1,1 |
| 9 | 46 | 312 | 0,0 | 11 | 5.00E + 06 | 3.25E + 06 | 1,1 |
| 11 | 14 | 196 | 0,0 | 13 | 5.00E + 06 | 1.28E + 08 | 1,0 |
| 13 | 17 | 182 | 0,0 | 15 | 5.00E + 06 | 7.06E + 06 | 1,1 |
| 15 | 13 | 160 | 0,0 | 17 | 5.00E + 06 | 574528 | 1,1 |
| 17 | 18 | 153 | 0,0 | | 5.00E + 06 | 94848 | 1,1 |

AUTOMATIC VOLTAGE RAMPING OF LENS 50

The automatic attenuation of the ion beam by applying varying voltages on lens 50 as shown in Table 1 provides a method which ensures that data can be obtained in the overlap region, even if the sample intensity is sufficiently large that the data would normally be in the analog only region 136 (1,1) or in the detector protect region 138 (1,0). This is evident in Table 1, where the data was acquired using a single 50 ppm solution, which is relatively concentrated. The usefulness of this method will be discussed below.

OPTIMIZING GAIN

The optimization and calibration of the dual detector 66 rely on the fact that in the overlap region 134, both pulse count values and analog values are valid. Therefore measurements taken within this range indicate the relationship between the two values. For increased accuracy, the system preferably takes measurements, plots lines and reports correlation coefficients obtained by standard curve fitting techniques throughout the entire overlap range, as will be discussed below.

If the input current produced by the ions incident on the detector is $I_{IN}$, and if the output or analog current is $I_A$, then there is a fixed relationship between the two: $I_A=f(G,I_{IN})$, where G is the gain. The gain is determined by −V applied, which determines the total number of electrons ejected per incident ion. In cases where $I_A$ exceeds several microamperes, a typical electron multiplier tends to saturate and $f(G,I_{IN})$ has an exponential dependence. Therefore the gain G is preferably selected such that saturation does not occur. Under these conditions there is a simple linear relationship:

$$I_A=I_{IN}G \qquad (1)$$

In addition, $I_{IN}$=n.c, where n is the number of ions/second and c is the Faraday constant ($1{,}602\times10^{-19}$ coulombs/charge).

$$\text{Therefore } I_A=ncG. \qquad (2)$$

It can therefore be seen that the maximum desired input count rate, n, determines the desired gain for a fixed output current, $I_A$. Prototype experiments were performed to demonstrate that a typical detector maintains a linear response up to at least $I_A$=2 microamperes. Therefore, for example, if $I_A$=2 microamperes and if the desired maximum count rate $n=10^9$ cps, then $G=1.25\times10^4$. Similarly, if $n=10^{10}$ cps, then for $I_A$=2 micro amperes, then $G=1.25\times10^3$, etc. Thus the user can choose a target gain to select accordingly a maximum effective input count rate, and therefore the dynamic range of the detector system. The usefulness of this will be discussed below.

The output current $I_A$ is transformed into a corresponding pulse count determined by the voltage to frequency conversion factor of the instrument, which is:

$$I_A=\frac{f\text{Hz}}{64\times10^{12}\frac{\text{Hz}}{A}} \qquad (3)$$

Thus the frequency seen at line 250 from the analog prescaler 214 is:

$$f\text{H}_z=ncG64\times10^{12}\frac{\text{Hz}}{A} \qquad (4)$$

It should be noted that in the pulse only region 132, the gain of the detector 66 at pulse count electrode is saturated so that the distribution of charge in the output pulses forms a relatively narrow Gaussian distribution, only weakly dependent on ion mass. Typical gains which create detectable pulses are $10^7$ to $10^8$. However in analog mode, the output current depends directly on the electron yield of the ion impact, which depends largely on ion velocity. Since all ions are accelerated to the same kinetic energy, heavy ions have lower velocity and yield fewer electrons. Therefore the gain of the detector drops substantially as the mass increases and tends to have a $(1/\text{mass})^n$ dependence, where n~=⅓ to ¼. Thus the ratio between the pulse count rate and the analog current is mass dependent, so that Equation 4 becomes $$f\text{H}_z=ncG(m)64\times10^{12}\frac{\text{Hz}}{A} \qquad (4a)$$

where m is the mass. Therefore the system 10 must be calibrated for mass response.

When using a typical ICP-MS system 10 according to the embodiments of the invention, it is possible selectively to optimize the analog gain of detector 66 quickly and automatically, by adjusting the high voltage –V applied to the dynode 86, thereby allowing the user to choose a maximum input count rate (typically over a range of 50–100) quickly and easily. The high voltage –V is iteratively adjusted in order to find a target gain, and is automatically performed by the system controller 70 software.

Figure 13A:
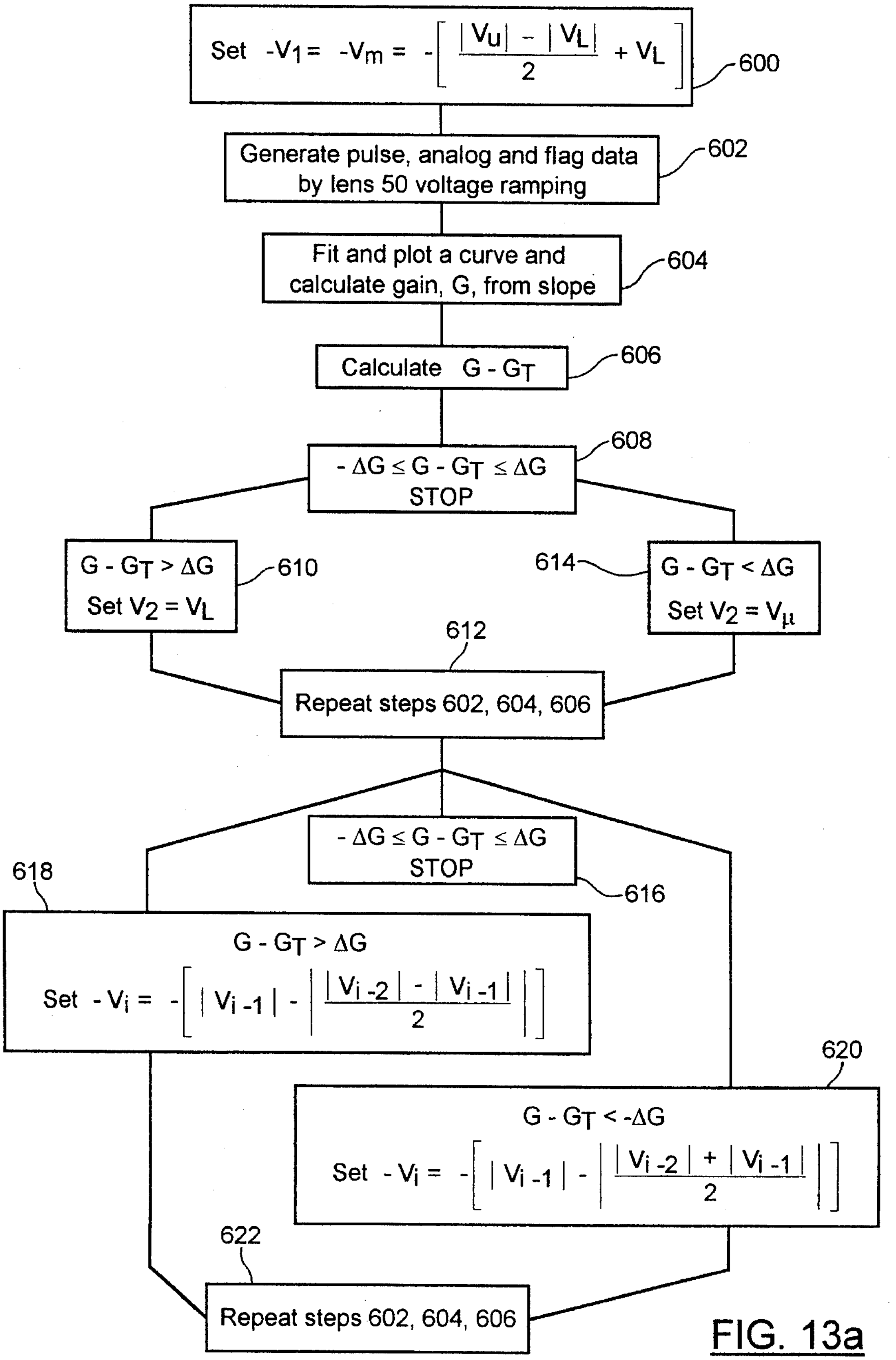
FIG. 13A is a flow chart showing a bisection method for auto optimization.

The automatic procedure uses a bisection method to achieve a target gain ($G_T$), as follows. The software first sets a midpoint voltage $-V_m$ defined as $$-\left(\frac{|V_u|-|V_L|}{2}+|V_L|\right)$$

where $V_u$ is the upper voltage of a selected range and $V_L$ is the lower voltage of the selected range (block 600 in FIG. 13A). Using this voltage, and using as an input to the detector system a desired element on which to optimize (e.g. $Ar_2$), pulse, analog and flag data are then generated using the selected midpoint voltage $-V_m$ (block 602 in FIG. 13A). For each attempted –V in the optimization procedure in FIG. 13A, a curve of varying intensity, typically 1–2 orders of magnitude, but possibly higher, is generated and plotted as indicated in block 602, 604 of FIG. 13A. The varying intensities are achieved by ramping the voltage on lens 50 through a range of voltages which attenuates a single ion beam by defocusing. (In a typical lens, these voltages may range from –20 volts to +20 volts in a series of steps).

A straight line is then fitted to the points generated and a gain is calculated from the slope of the line (block 604). This gain is compared to the target gain $G_T$ (block 606).

At this point there are three possibilities. If the achieved gain equals the target gain within a selected error Δ, the process is stopped and optimization is complete (block 608). If the achieved gain is too high (block 610) the next high voltage $V_2$ is set equal to $V_L$ (also block 610) and steps 602 to 606 are repeated (block 612). If the achieved gain is too low, voltage $V_2$ is set equal to $V_u$ (block 614) and again blocks 602 to 606 are repeated (block 612). Then again the determination is made of whether the achieved gain equals the target gain within the error A (block 616). If so, the procedure stops. If not, an iteration procedure begins. If the gain is too high, the next voltage $V_i$ is set at the previous value minus the midpoint of the previous two values (block 618). If the gain is too low, the next high voltage $V_i$ is set at the previous value plus the midpoint of the previous two values (block 620). This procedure is repeated (block 622) until the achieved gain equals the target gain within the specified error Δ. As mentioned, the error Δ is user selectable, as are the upper and lower starting voltages $V_L$ and $V_u$.

An example is shown in Table 2 below. Here the target gain, $G_T$ is $2\times10^4$ with ΔG=200. The upper and lower voltages defining the range are –3000 and –1700 respectively. The element chosen on which to optimize is $Ar_2$. This target gain gives a maximum ion signal of $5\times10^8$–$1\times10^9$ cps for 0–300 amu. (The user can of course optimize on any desired substance.)

TABLE 2

| PASS NO. | MINUS HIGH VOLTAGE | GAIN |
|---|---|---|
| 1 | –2350 | 42,686 (too high) |
| 2 | –1700 | 10,000 (too low) |
| 3 | –2025 | 14,671 (too low) |
| 4 | –2187 | 21,000 (too high) |
| 5 | –2106 | 19,970 (acceptable) |

Although a fixed gain could be preferable for standard applications, it is sometimes desirable to extend the maximum input count rate for high concentration solutions or to decrease the maximum input count rate by increasing –V (and therefore gain), which can improve the ion extraction efficiency for the pulse counting mode.

Figure 13B:
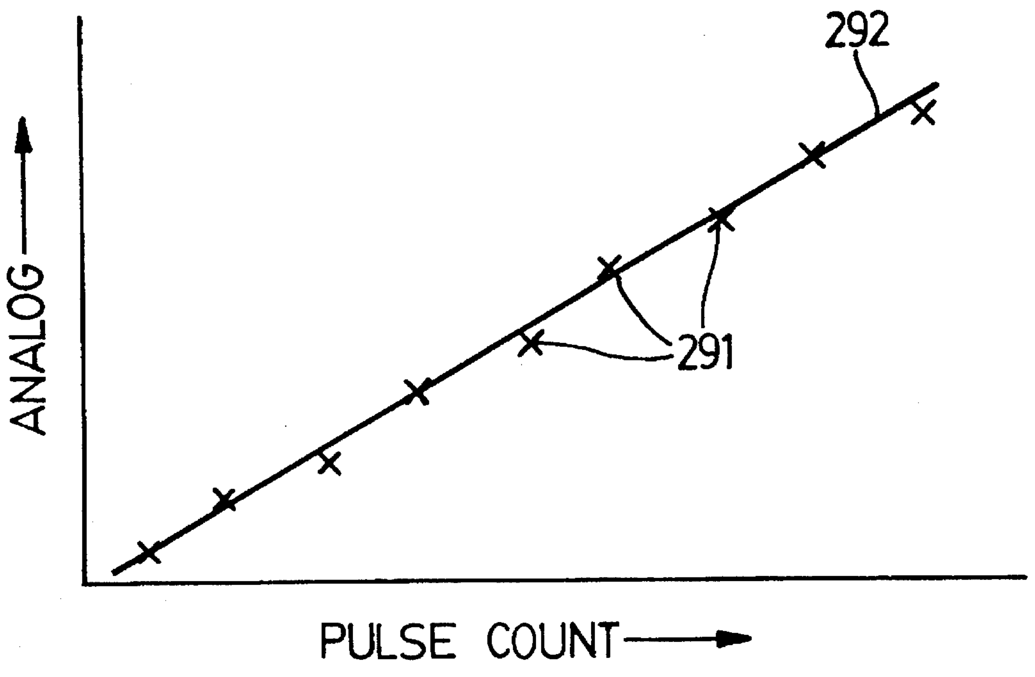
FIG. 13B is a graph showing analog signal versus pulse signal during optimization of a system of the invention.
Figures 14A, 14B, 14C, 14D, 14E:
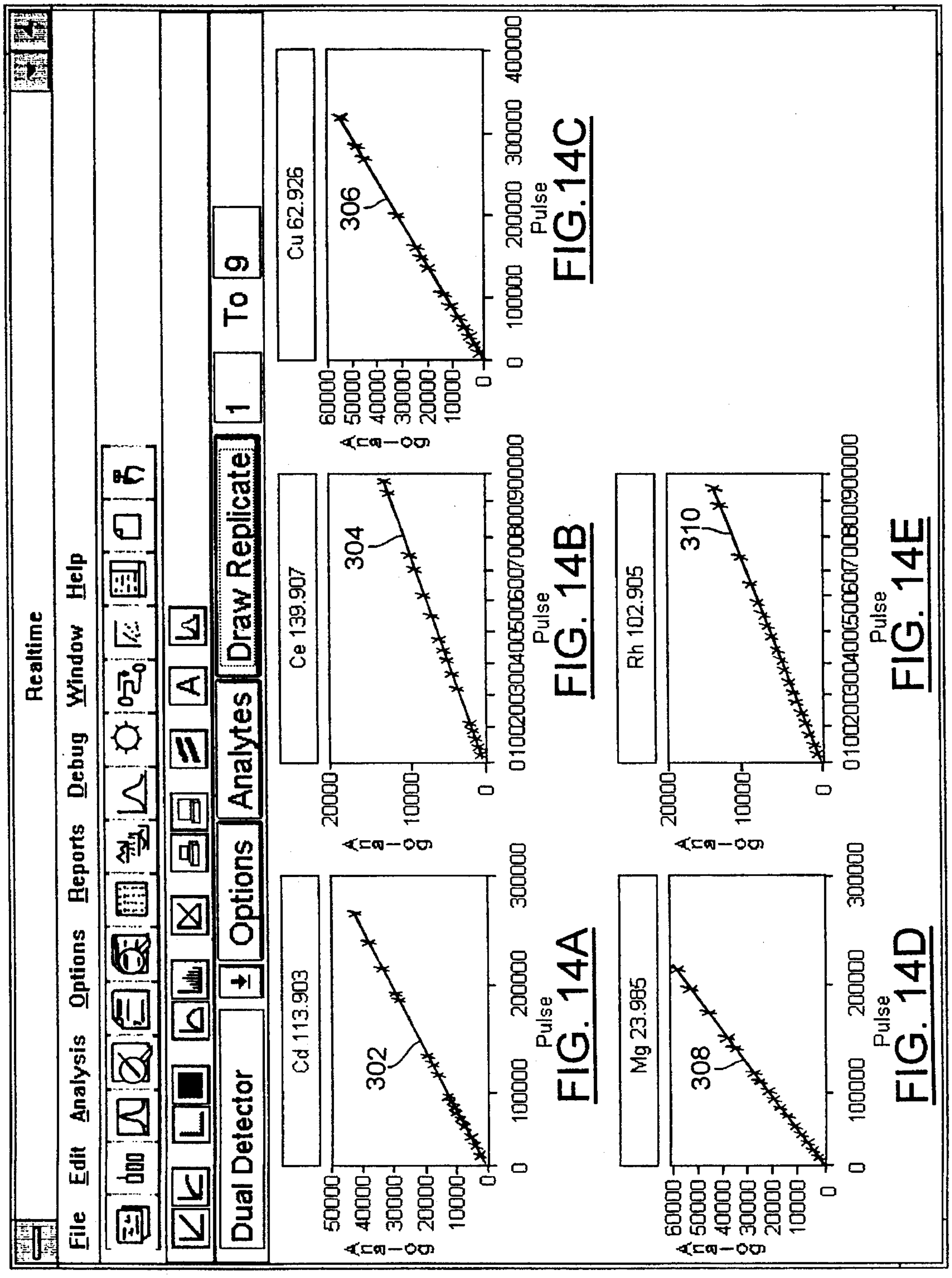
FIGS. 14A to 14E are graphs showing analog signal versus pulse signal (i.e. gain times Faraday constant) for five different masses for a system of the invention.

The ramping of the voltage on lens 50 allows a method of ensuring that some points will be in the overlap region 134 so long as the sample has sufficient intensity to be in the overlap region. In this way, optimization can be performed on a single ion beam with an unknown intensity. For example a beam of very high intensity will be attenuated to generate points in the overlap region 134. An example using $Ar_2$ is shown in FIG. 13B (sheet 4 of the drawings), where analog intensity is plotted on the vertical axis and pulse counts are plotted on the horizontal axis. A number of points 291 of the curve 292 are plotted, each for a different voltage setting of lens 50. The use of more than one point gives greater accuracy and also permits checking the linearity of the system. Also, the quality of the linear plot can be checked visually, as well as by using a correlation coefficient obtained by standard curve fitting techniques.

Because as the detector ages and also as it becomes contaminated, the gain decreases, the instrument should be optimized each time it is used, or when the user would like to select a different maximum input count rate.

For accuracy a process called "detector deadtime correction" can also be performed at this time. This is discussed later in this disclosure.

CALIBRATION

Figure 15:
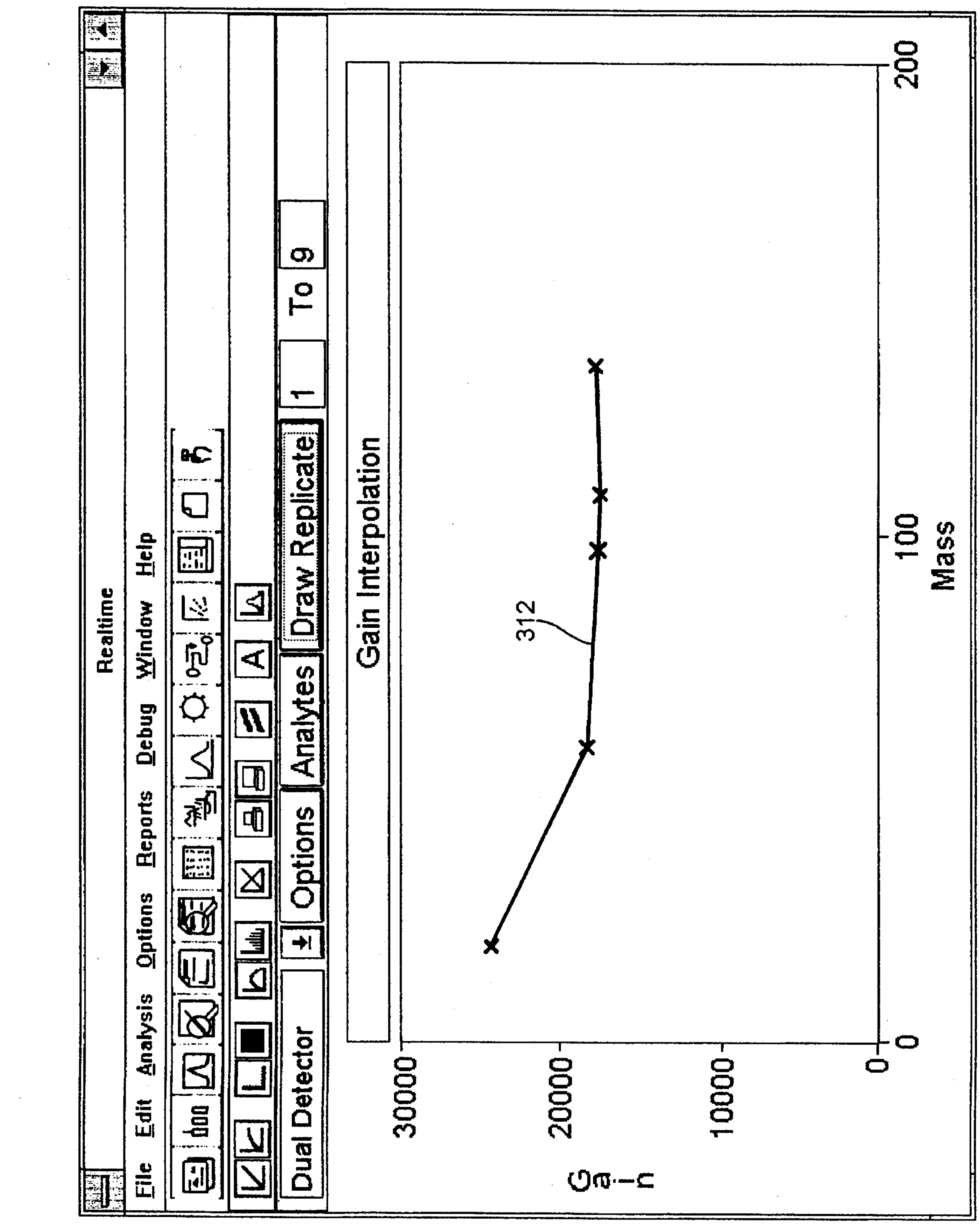
FIG. 15 is a graph showing electron multiplier analog gain versus ion atomic mass for a system of the invention.

System calibration is employed in a similar manner, but for the –V corresponding to the target gain, using different substances. FIGS. 14A to 14E show calibration curves 302 to 310 for the substances cadmium, cerium, copper, magnesium, and rhodium respectively. In each case analog intensity is plotted on the vertical axis and pulse counts are plotted on the horizontal axis. The curves 302 to 310 are each measured at a number of points in the overlap region 134 again determined by ramping the lens 50, and a straight line is fitted through the resultant points. The slope of the line is determined and the gain is computed from the slope. The quality of the line is visually displayed as well as indicated by the correlation coefficient. The resultant gain values are then plotted against mass as shown in FIG. 15 to yield a gain curve 312. From curve 312 the instrument can determine the relationship between gains and masses at positions between the measured points (e.g. by interpolation). Although calibration has been shown using five masses, more (e.g. 20 to about 300 masses) can be used if desired.

The automatic ramping of the voltage on lens 50 ensures that points will be obtained in the overlap region 134 even with unknown sample intensities, as long as there is sufficient intensity to generate some points in the overlap region. Thus calibration can be performed on any sample of sufficient intensity. In this way lens voltage ramping allows calibration when the data is acquired in peak hopping mode, where only the maxima of the mass peaks are monitored, simply by attenuating the ion beam, thus generating points in the overlap region. This is important because this procedure allows calibration to proceed intermittently and automatically, using the same method which the user employs for normal data acquisition. Thus calibration can be done "on the fly" in peak hopping mode.

By way of example, the software in the system controller 70 can be set so that periodically, e.g. once per hour, the voltage on lens 50 is automatically ramped with the system recalibrating itself, and with a record of this being stored in memory. If at the allotted time the system is performing a different task, either the calibration will wait until that task is completed, or else a "wait" will be inserted in the task so that the recalibration can be accomplished. As mentioned it is unnecessary to know the make-up of the sample. If the sample produces an intense ion beam, the attenuation will ensure that points are generated in the overlap region. If the sample is of low concentration so that no points are generated in the overlap region, the user will not care about this since a response in the pulse count only region 132 will then be sufficient for the sample in question.

MASS SPECTRA INFORMATION

Figure 16:
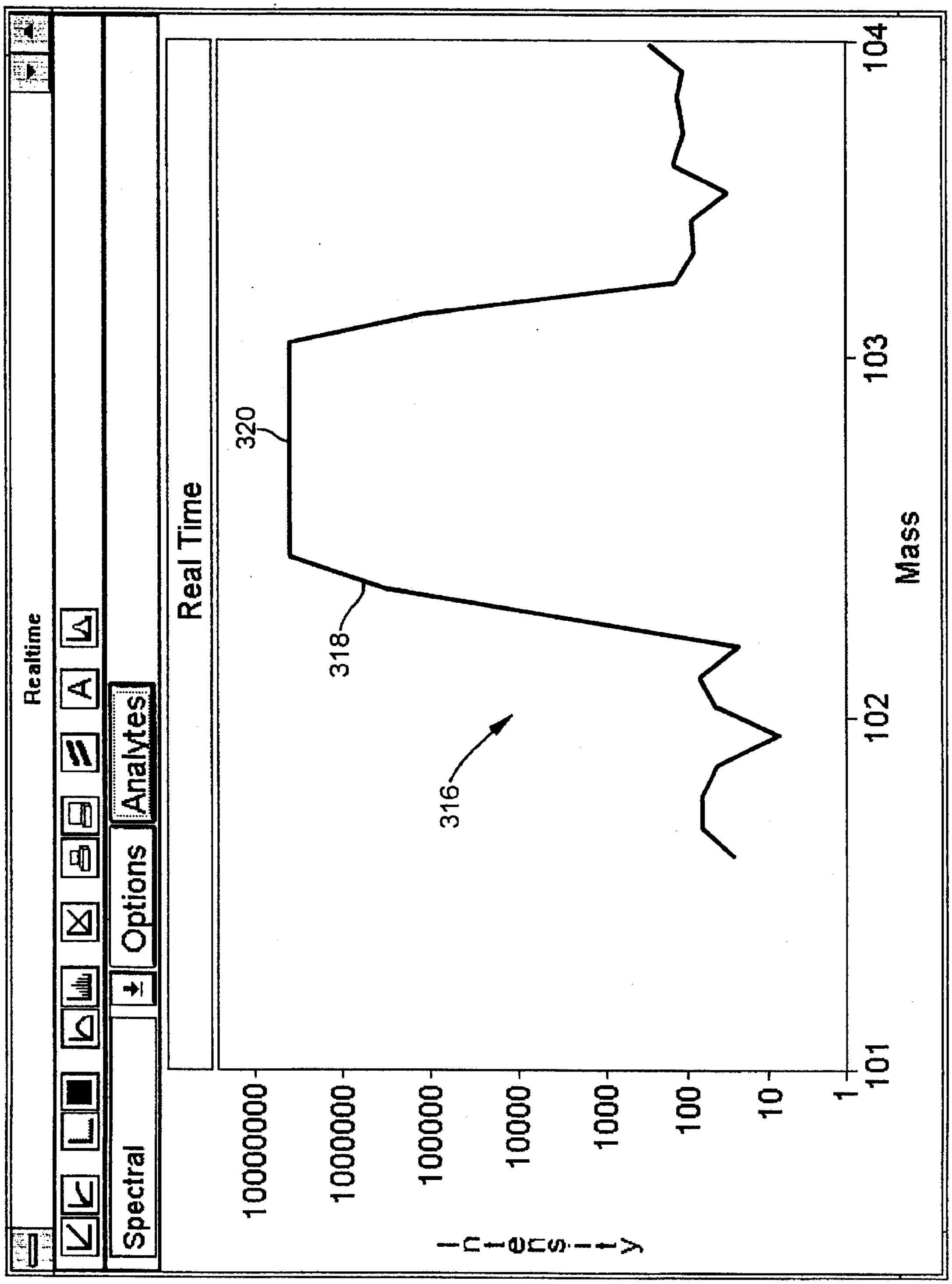
FIG. 16 is a portion of a mass spectrum showing a single peak plotted using a pulse counting signal only.

Reference is next made to FIG. 16, which shows an expanded portion 316 of a mass spectrum in which intensity (pulse count or converted analog signal) is plotted on the vertical axis and mass on the horizontal axis. The spectrum of FIG. 16 was drawn using the pulse count only signal, without an analog signal (although the analog signal was available at the user's option). In the point of the peak 318 indicated by flat top 320, the signal intensity reached the analog only region 136, and the pulse signal was cut off. Instead of reducing the intensity to zero at this point, the system software is arranged to draw the flat top on the peak 318. This shows the user that the signal was cut off and avoids the likelihood that the user would think that there were two separate peaks one on each side of the zero signal location. The mass response curve allows accurate display of the true counts per second cutoff using the mass dependent conversion factor and the analog comparator level. Specifically, the true counts per second at cut off, $I_{pp}$, is: $I_{pp}=F_{pp}/cG(m)64\times10^{12}$, where $F_{pp}$ is the analog frequency at which the shutdown occurs, and which is a function of the voltage $V_{pp}$ on the pulse protect comparator 144. In a typical system $F_{pp}=2\times10^5\ V_{pp}$. Recall that c is the Faraday constant ($1.602\times10^{-19}$ coulombs/ampere), and G(m) is the mass dependent analog gain.

Figure 17:
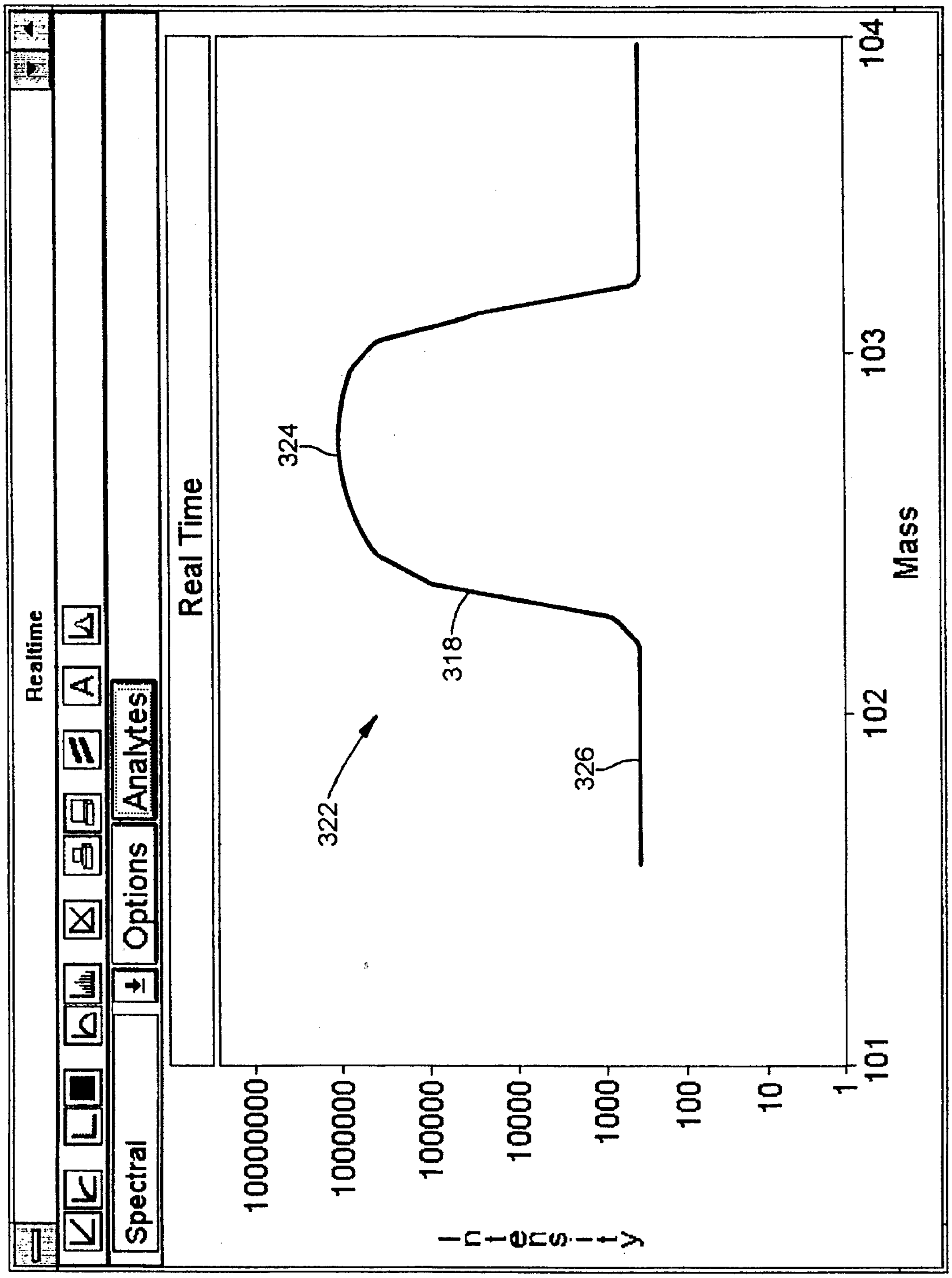
FIG. 17 shows a mass spectrum portion similar to that of FIG. 16 but made using an analog signal only.

FIG. 17 shows a curve 322 similar to that of FIG. 16 but made using the analog only signal. It will be seen that the top 324 of peak 318 is illustrated, but the base line 326 is very high and the details of the lower intensity portion of the spectrum are missing.

Figure 18:
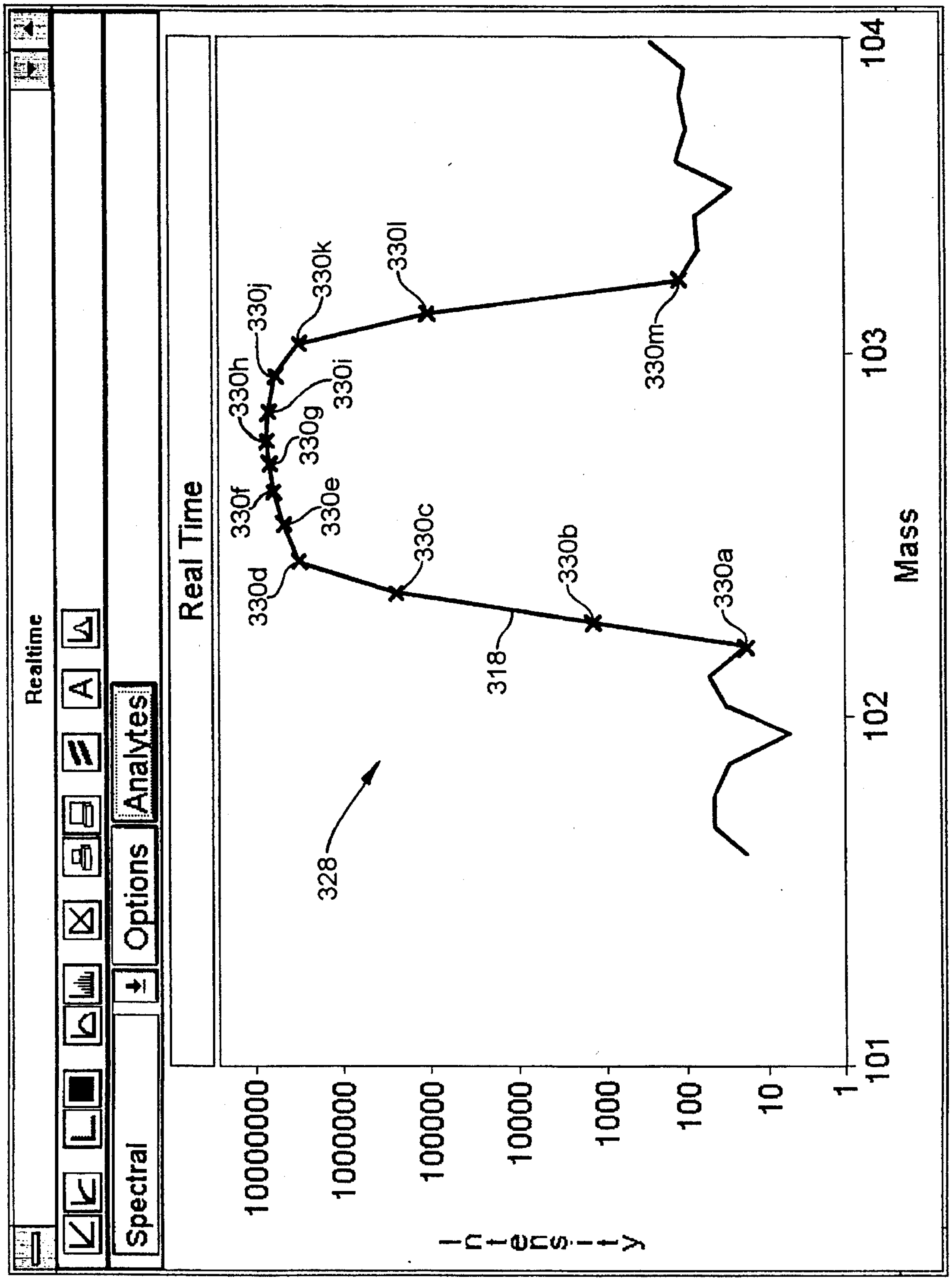
FIG. 18 shows a mass spectrum portion similar to those of FIGS. 16 and 17 but using both pulse and analog signals.

FIG. 18 shows a mass spectrum 328 similar to those of FIGS. 16 and 17 but drawn using both the pulse and converted analog signals. In FIG. 18 the peak 318 can be constructed from (for example) as many as 21 points. Examples of such points are indicated at **330*a* to 330*m* in FIG. 18**. As above, the mass response curve allows accurate display of the true counts per second cutoff.

As shown in FIG. 18, the points **330*a* to 330*d* and 330*j* to 330*m*, for which the intensity is in the pulse count only region 132 and in the overlap region 134, are drawn using the pulse count signal from terminal 96. The points 330*e* to 330*i*, for which the intensity is in the analog only region 136 are drawn using the analog signal from terminal 92**.

Figure 19:
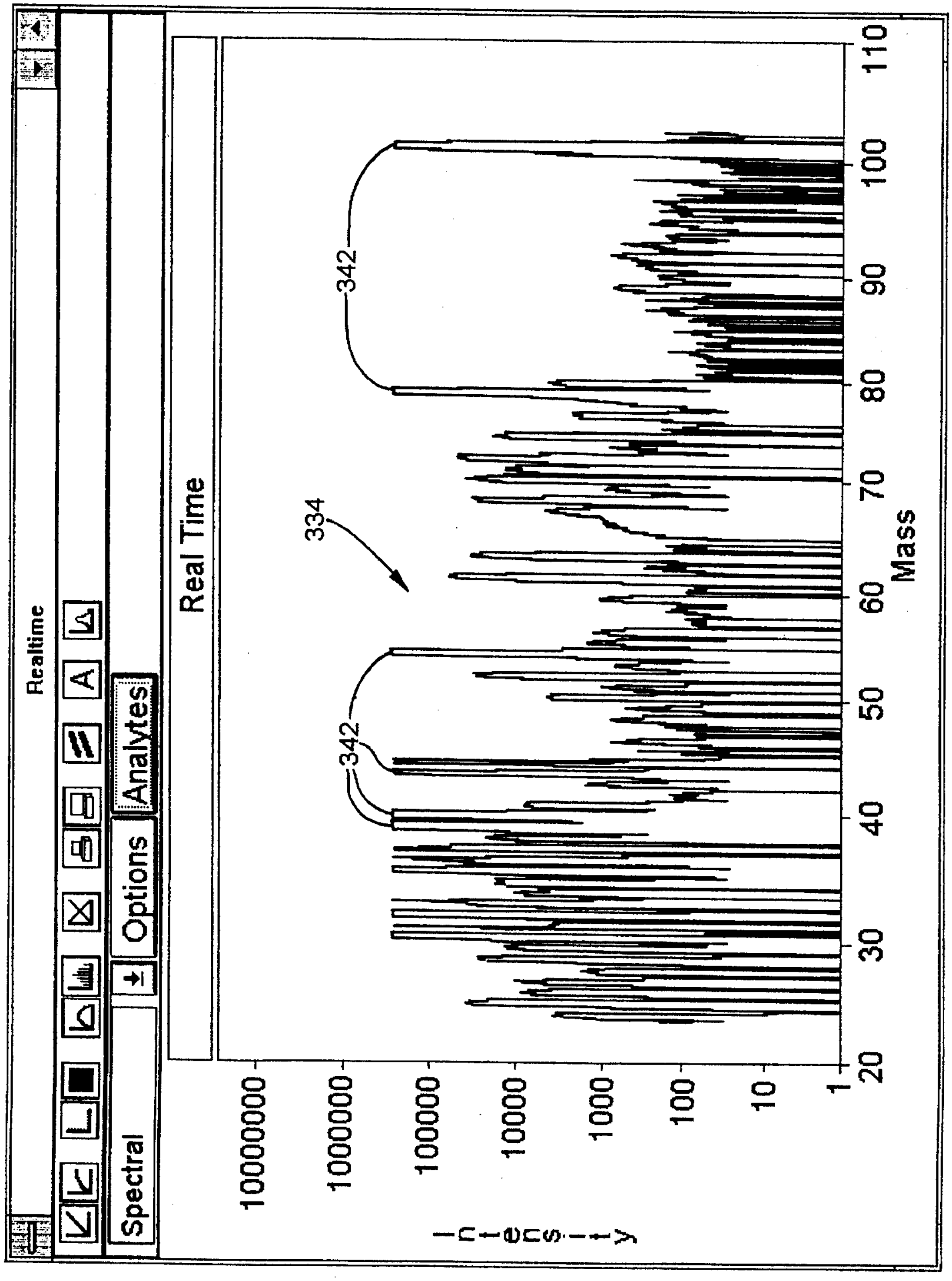
FIG. 19 shows a full mass spectrum made using a pulse counting signal only.
Figure 20:
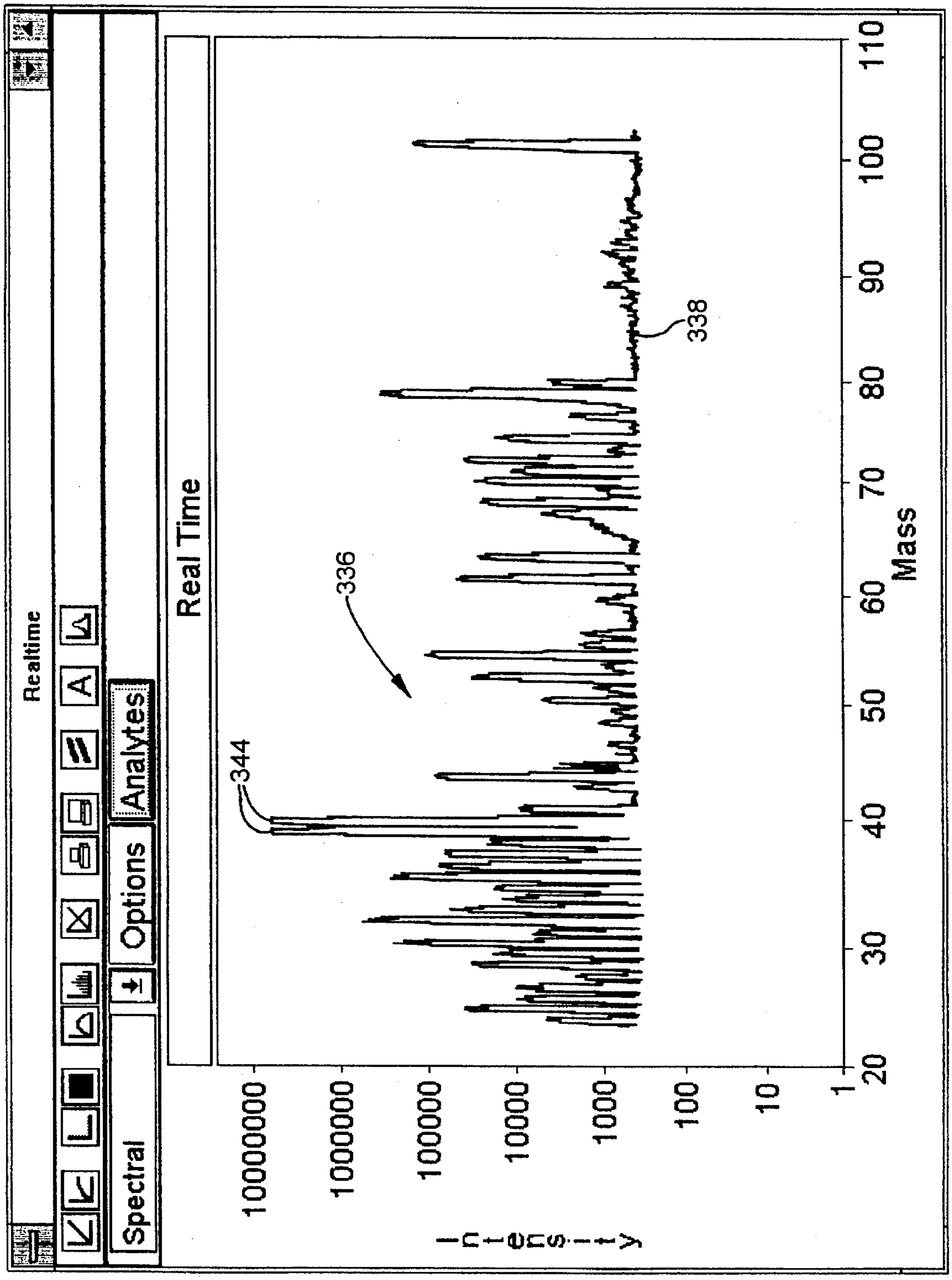
FIG. 20 shows a mass spectrum similar to that of FIG. 19 but drawn using an analog signal only.
Figure 21:
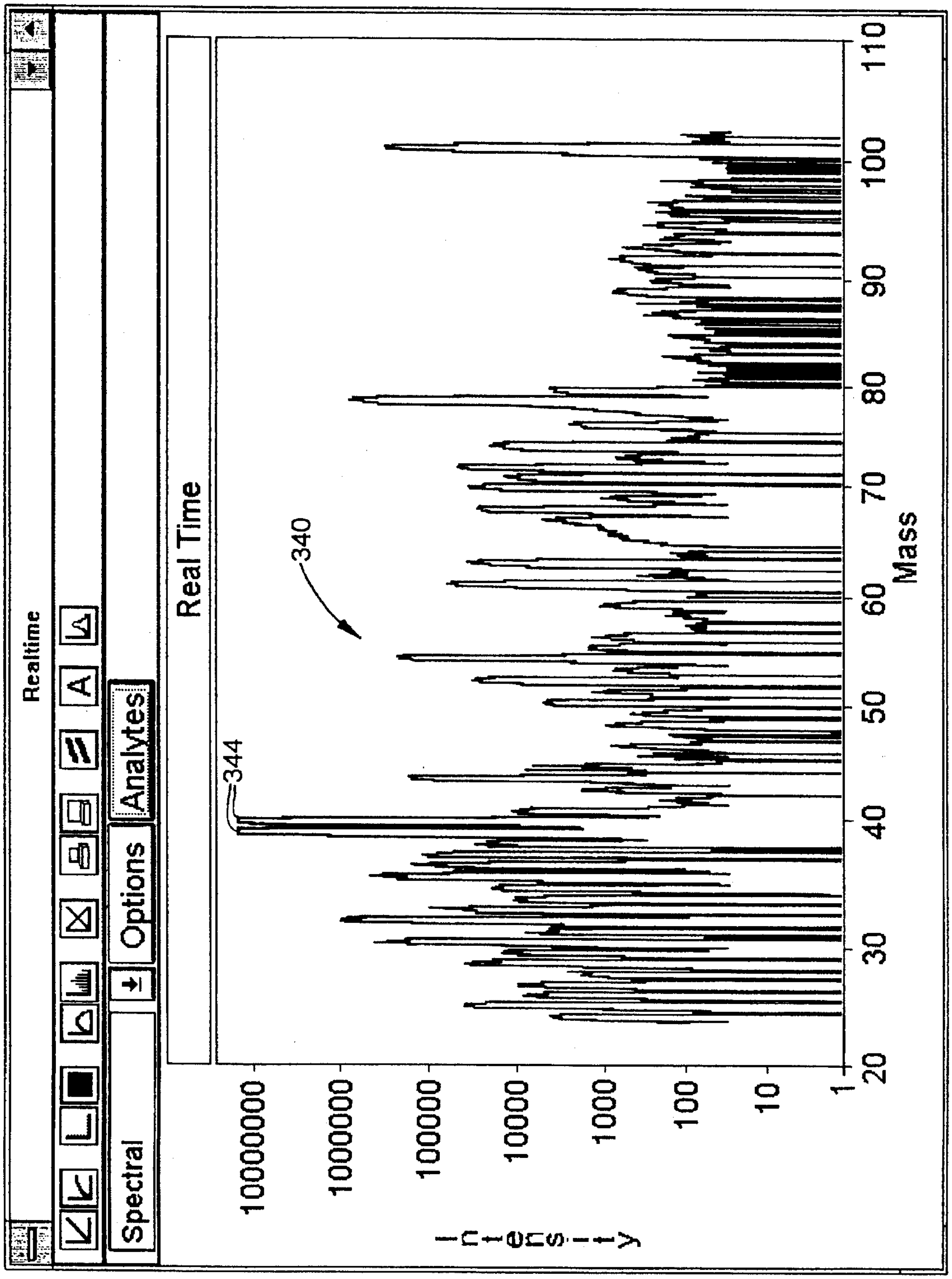
FIG. 21 shows a mass spectrum similar to those of FIGS. 19 and 20 but made using both pulse and analog signals.

The same procedure may be used when drawing a full mass spectrum, as shown in FIGS. 19 to 21. FIG. 19 shows a mass spectrum 334 drawn using the pulse count signal only; FIG. 20 shows the same mass spectrum drawn at 336 using the analog signal only (and therefore having a high base line 338), and FIG. 21 shows the same mass spectrum drawn at 340 using both signals together. In FIG. 19 it will be seen that a number of peaks have flat tops shown at 342, indicating that the pulse count signal was cut off at those locations. The base line of the peaks in FIG. 19 is essentially at the horizontal axis, since the background signal in pulse counting mode can be nearly zero.

In FIGS. 20 and 21, the tops of certain peaks 344 are again cut off (flat). These peaks represent argon and argon hydride, which were present in large quantities since argon was the gas used to carry the sample into the plasma. These signal were in the neither plus nor analog region 178 of FIG. 5, as indicated by the flat peaks 344.

Figure 23:
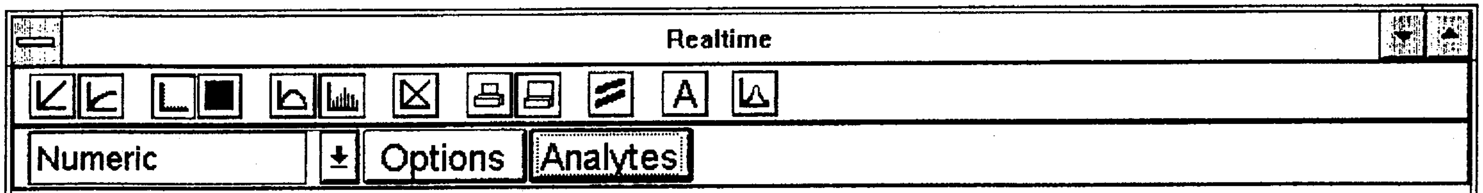
FIG. 23 shows a numeric screen print made using an analog signal only.

Intensity for various peaks can also be displayed in screen prints, and printed on a printer, as shown in FIGS. 22 to 24 inclusive, or stored in memory for further analysis or diagnostic purposes. FIG. 22 is a screen print showing at the left hand side the replicate number (several scans or sweeps of the mass spectrum were made and the replicate number simply indicates the scan number). The time column indicates the cumulative elapsed time. The intensity columns show the intensities recorded at mass 8 (assumed to be background noise), and at the masses for magnesium and rhodium.

FIG. 22 was produced using data from the pulse count signal only, dwelling on the portion of maximum intensity of each peak (this is referred to as peak hopping). Intensities are recorded at mass 8 and for magnesium, but for rhodium the pulse count signal was shut off (by the pulse protect comparator 144) and the symbol 1#J appears to indicate this cut-off (any suitable symbol may be used).

In FIG. 23, which was made using analog only data (acquired at the same time as the pulse count data), again dwelling on the portion of maximum intensity of each peak, it will be seen that the background signal is much higher (due to a positive frequency offset introduced into the electronics which can easily be subtracted in software), and intensities are displayed for both magnesium and rhodium. (The positive frequency offset ensures that ion flux causing small analog counts will be detected instead of being zero suppressed by the amplifier electronics; as mentioned, the positive frequency offset can be subtracted later.) If the analog signal had reached a level at which it entered the neither pulse nor analog region 138, this would have been displayed on the screen print by another symbol, e.g. 2#J.

FIG. 24 was made using both sets of data, i.e. using pulse count only data where such data is valid, and elsewhere using analog data, with the analog data being converted to the same scale as the pulse count data, and also dwelling on the portion of maximum intensity of each peak. This mode uses the mass response gain curves since points can be in any of the regions described.

Because all of the data, and the flags which accompany the data, are stored in memory, the user can retrieve all of such information later and can reprocess the data using any of the modes described, e.g. pulse only mode, analog only mode, or pulse and analog modes together. Because all of the data, including the flags, is stored and remains available, the user can thus re-evaluate the data at any time, e.g. in the light of fresh insights which may have been gained in understanding the significance of various results.

DEADTIME CORRECTION

The problem of "deadtime" correction will next be described. It is well known that when the system reaches high pulse counts, pulse overlap becomes a problem. The pulses are typically between 10 and 20 nanoseconds wide, and when two pulses overlap, they are simply counted as one pulse; this is referred to as a deadtime error. At a pulse count read of about 1 Megahertz, there is a deadtime error of a few percent. At 10 Megahertz the deadtime error becomes of the order of 80%.

To deal with the deadtime error, an empirical correction factor is used. In general, where $n_t$ is the true number of counts and $n_o$ is the observed number of counts, the relationship can be expressed as:

$$n_t = \frac{n_o}{(1 - x_d n_o)} \tag{5}$$

where $x_d$ is the deadtime correction factor, and is typically between 25 and 100 nanoseconds. At low count rates $n_t=n_o$.

In the past, the deadtime correction factor $x_d$ was usually determined by performing a test in pulse only mode using an element with two isotopes, one of high intensity and one of low intensity. In the first part of the test a low signal level for both was used so that no deadtime correction was needed; in the second part a high level signal for one was used so that a deadtime correction was needed. The deadtime correction factor $x_d$ was then determined by giving it such value as was needed to make the response linear between the low and high level signals. This was a cumbersome and time consuming process and tended to lack high accuracy.

Figure 25:
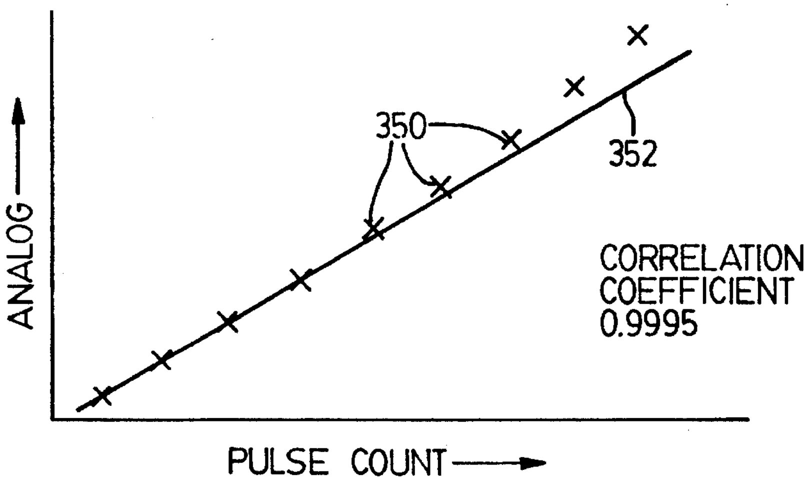
FIG. 25 is a graph showing analog versus pulse count signals and showing fitting of a curve to a number of points.
Figure 26:
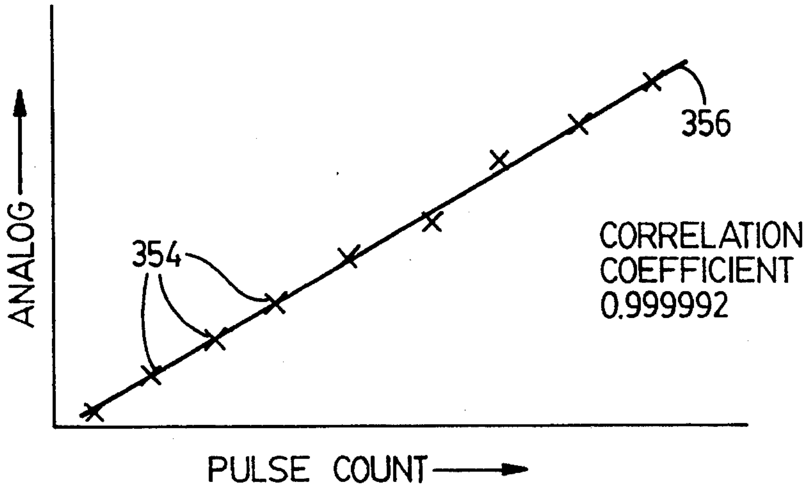
FIG. 26 is a graph similar to that of FIG. 5 but showing fitting of a curve to different points.

Using the embodiments of the invention as described, it is possible to determine a deadtime correction factor quickly and automatically. Reference is made to FIGS. 25 and 26, which both show plots of analog intensity on the vertical axis versus pulse count on the horizontal axis. The varying intensities are obtained using a single ion beam, by ramping the voltage on lens 50. FIG. 25 shows a number of points 350 which were measured using a deadtime correction factor which was known to be incorrect (e.g. 0). It will be seen that the line 352 fits the point 350 quite poorly. Using a conventional curve fitting correlation formula, it was determined that the correlation factor by which line 352 fits the points 350 was 0.9995. The relatively small number of "9's" meant that the correlation was poor (a correlation coefficient of 1 means a perfect fit).

In FIG. 26, a more accurate deadtime correction factor (e.g. 50 nanoseconds) was used, and it will be seen that the line 354 fits the points 356 much more closely. The correlation coefficient for FIG. 26 was 0.999992, which was much better.

Figure 27:
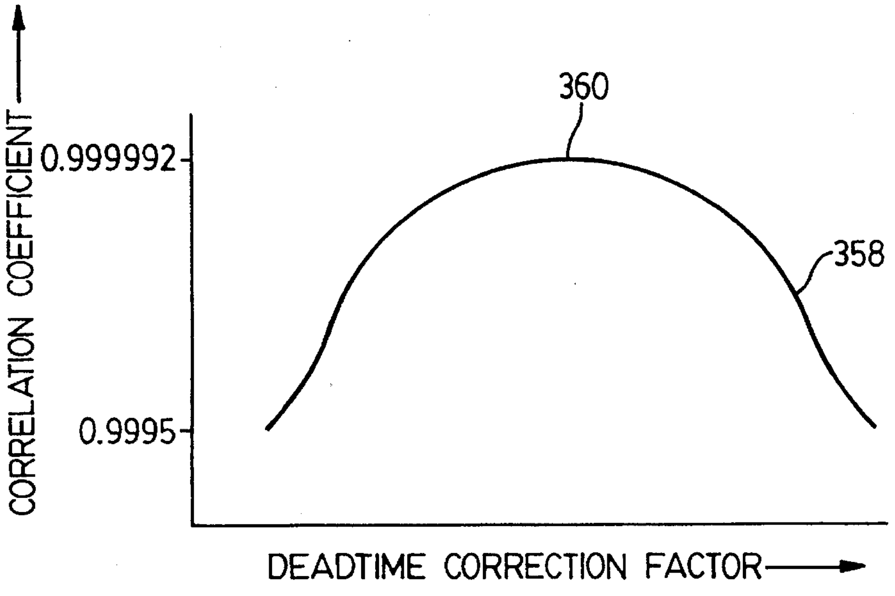
FIG. 27 is a graph showing correlation coefficient plotted versus deadtime correction factor.

In general, as shown in FIG. 27, which plots the correlation coefficient against the deadtime correction factor, it will be seen that the number of 9's in the correlation coefficient is low at the left hand side of curve 358 and increases to a maximum (with 5 9's) at the peak 360 of curve 358. As the deadtime correction factor continues to increase, the curve 358 then falls off.

This is also illustrated in Table 2 below which shows the correlation coefficient for various values of the deadtime correction factor.

TABLE 3

| Deadtime Correction Factor | Correlation Coefficient |
|---|---|
| 30 | 0.999881 |
| 35 | 0.999926 |
| 40 | 0.999981 |
| 45 | 0.999990 (best) |
| 50 | 0.999982 |
| 55 | 0.999971 |
| 60 | 0.999904 |

Figure 28:
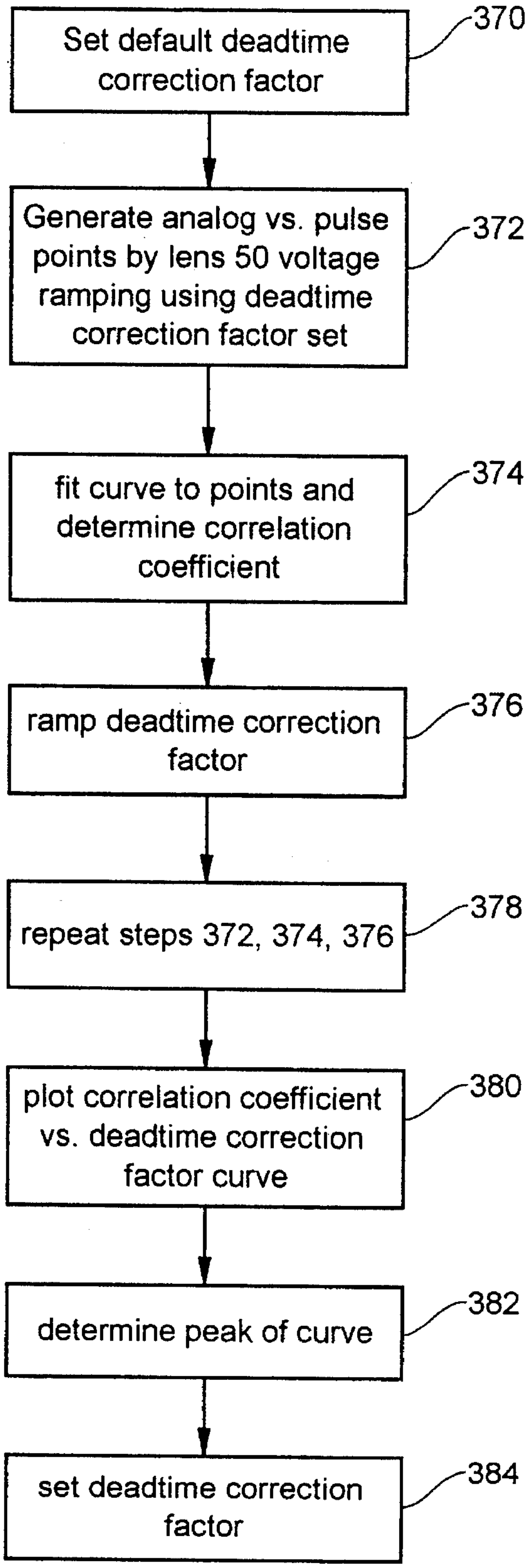
FIG. 28 is a flow chart showing logical determination of deadtime correction factor.

The automatic procedure to choose a deadtime correction factor is therefore as follows. The software first chooses a default deadtime correction factor, e.g. 30 nanoseconds (block 370 in FIG. 28). An analog versus pulse count curve is then generated by the lens voltage ramping method (block 372 in FIG. 28); a straight line is fitted to the curve, and the correlation coefficient is determined (block 374). The deadtime correction factor is then ramped (block 376) and the process is repeated (block 378). The correlation coefficient versus deadtime factor is then optionally plotted (block 380), and in any event the peak or maximum value of the correlation coefficient is determined (block 382). When this peak is determined, the deadtime correction factor is set at that value (block 384). The deadtime correction factor is then used in equation 5 to determine the true number of counts per second from the observed number of counts per second.

As will be apparent, the three automatic procedures above, namely optimization, calibration and deadtime correction, all can be done on unknown sample intensities using the automatic ramping of the voltage on lens 50.

DIAGNOSTIC USE OF FLAGS

If the deadtime is not optimized, the flags previously described can assist in detecting this. For example, if several scans are made to determine peak shape, and three dwells are in pulse only region 132 and one dwell is in overlap region 134, then the system will signal average those values and label them as being in overlap region 134. If at the same time the numeric intensity display is low, this indicates a discrepancy between the signal value and the flag, indicating the possibility that the deadtime correction factor was set incorrectly. The visual display of the plots, as well as the correlation coefficients, can be used as a diagnostic indicating a problem with the deadtime correction factor.

Figure 29:
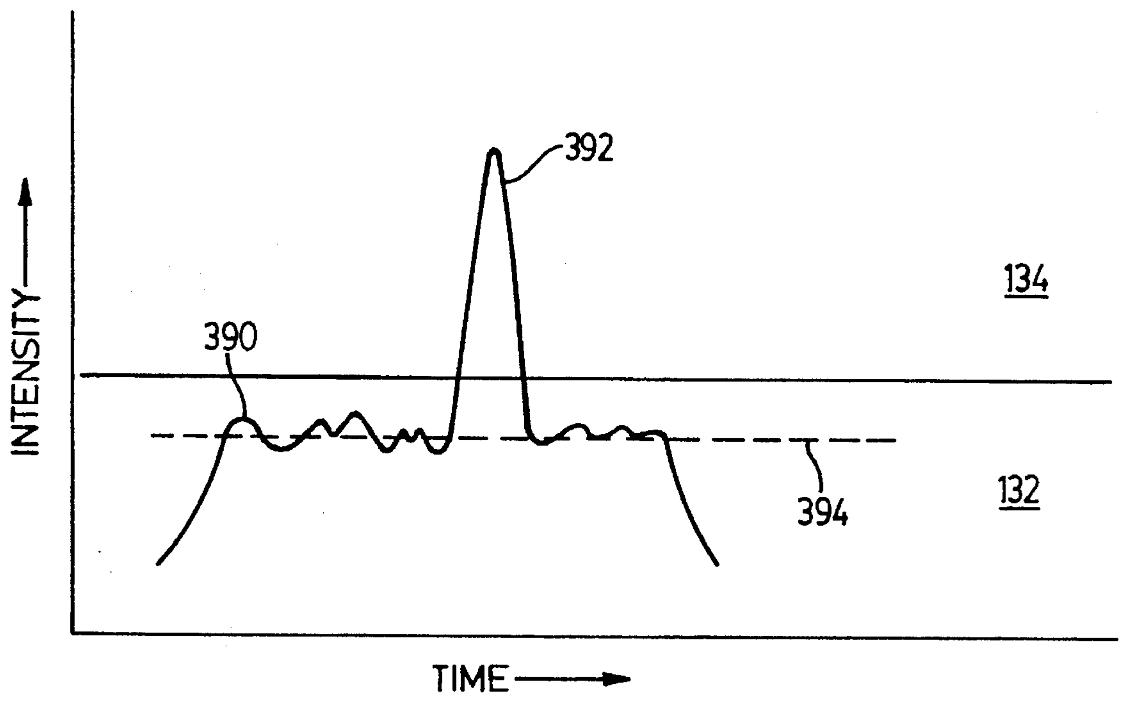
FIG. 29 is a graph of signal intensity versus time.

The flags can also be used to diagnose sample introduction problems. For example, as shown in FIG. 29, the signal (when dwelling continuously at a single setting of the mass spectrometer) may produce a signal of the form shown at curve 390. Curve 390 has a peak 92 which is in the overlap region 134, but the average level 394 of curve 390 is in pulse only region 132. Nevertheless, because of the existence of peak 392, the high created by cross calibrate comparator 142 will be latched in chip 172, setting flag (0,1). If this situation occurs intermittently on a variety of peaks, then it indicates sample introduction problems.

Figure 30:
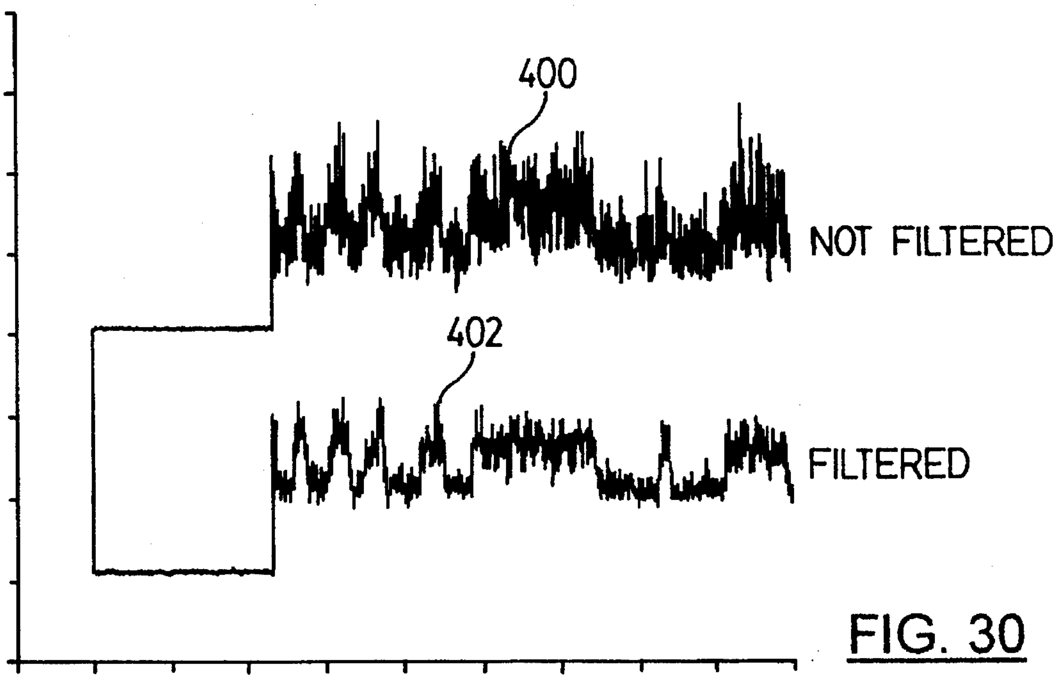
FIG. 30 is a graph showing signal intensity versus time for a noisy sample introduction system.
Figure 31:
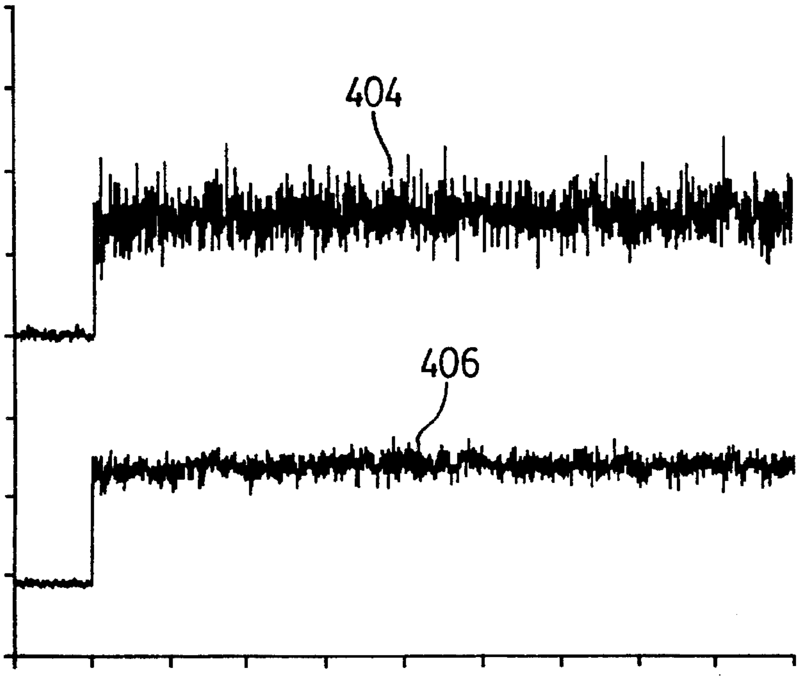
FIG. 31 is a graph similar to that of FIG. 30 but for a less noisy sample introduction system.

An example of this is shown in FIGS. 30, 31, which show the analog signal on the vertical axis plotted against time on the horizontal axis when dwelling on uranium. In FIG. 30 the unfiltered signal is shown at 400 and the filtered signal is shown at 402. Each square on the vertical axis represents one volt and each square on the horizontal axis represents one second. It will be seen from FIG. 30 that the filtered signal 402, which is the signal received by the electronics, is extremely noisy so that it set a higher flag than that warranted by the signal average. It developed that the tubing 14 through which the sample was injected into the torch was constricted due to aging. When a fresh tubing was inserted, the unfiltered and filtered signals were as shown at 404 and 406 in FIG. 31. The filtered signal 406 was of much better quality and set the correct flag for its intensity.

Figure 32:
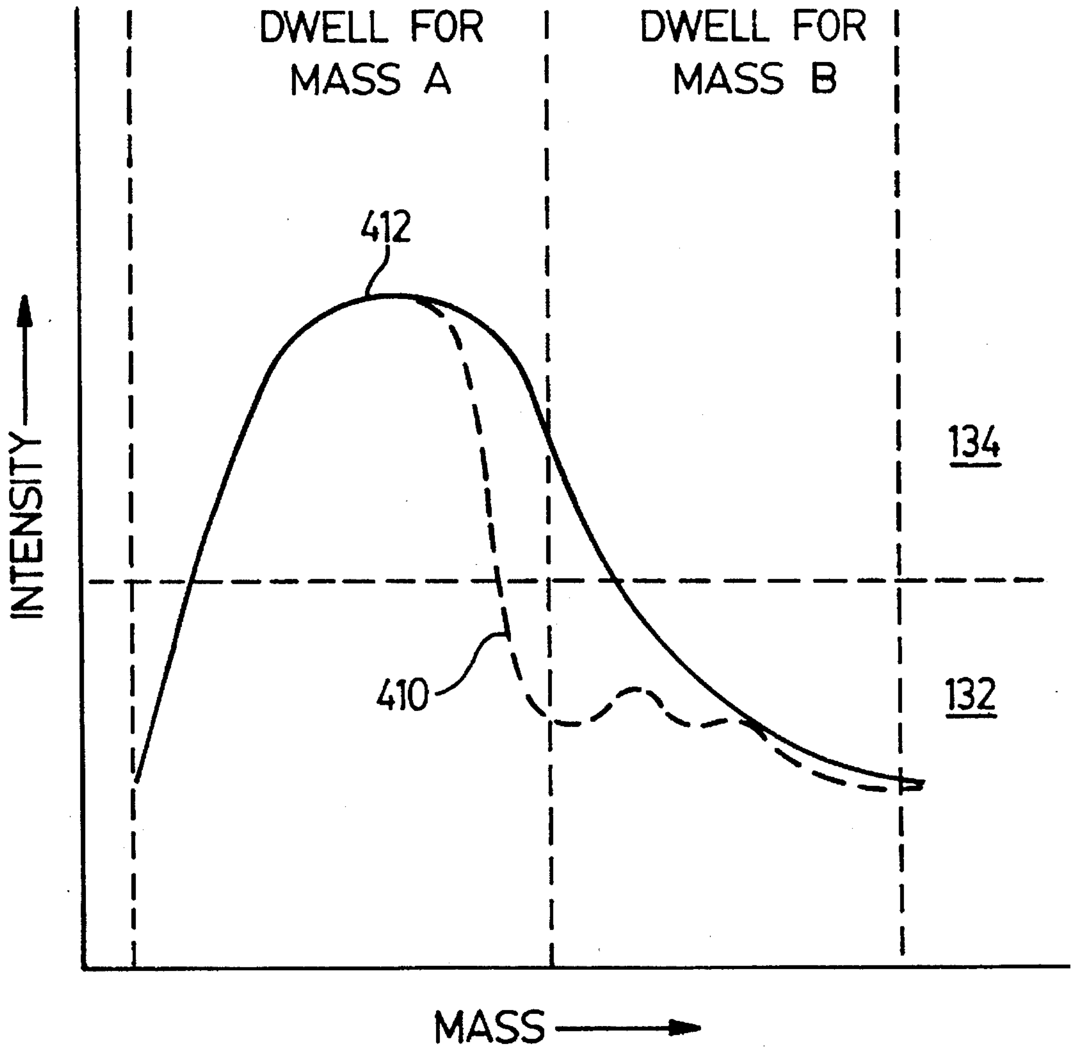
FIG. 32 is a graph showing intensity versus mass and showing the effects of a prolonged settling time.

Similarly, as shown in FIG. 32, the flags can be used to determine whether the settling time for the system has been incorrectly set, causing memory effects. In FIG. 32, which plots intensity on the vertical axis against mass on the horizontal axis, the true curve which should be obtained is shown at 410 and the actual curve observed is shown at 412, for masses identified as mass A and mass B. While the signal for mass B should be in pulse only region 132, and in fact the average level of signal 412 is in region 132, the initial intensity of signal 412 in the dwell from mass B will trip the overlap comparator 150, setting flag (0,1). The discrepancy between the flag and the numeric signal intensity, which can be automatically detected by the software, occurs repeatedly at certain peaks and not intermittently as would be the case for a noisy signal introduction system. This shows that a longer settling time is needed before counting for mass B begins. This diagnostic feature, like the noisy signal diagnostic feature, can be inserted in diagnostics software for the system.

The visual display of the plots, as well as the correlation coefficients, can also be used as a diagnostic tool for other system errors, eg. non-linearity, or if the pulse section gain is incorrect and/or erratic such that it is no longer saturated, of if the −V power supply has short term drift.

The flags can also be used to color code the signal where desired. For example when a mass spectrum or numeric intensity is displayed, the flags can be used in simple fashion to color code the signal as, e.g., red, green or blue, or distinguishing symbols can be associated with the signal, a different color or symbol being used for the part of the signal in each region. In addition, in mass spectrum displays, lines can be displayed (like the line between regions 132,134 in FIG. 29) to demarcate the different regions.

The flags can also be used to bound the range of useable gains during the optimization procedure. For example, if the target gain or −V is too low, the data points may all be flagged (0,0). This information can be used to indicate why a failure occurred in finding the target gain or to suggest a voltage where a (0,1) flag is obtained. A similar procedure can be used when −V is too high, to achieve a target gain.

The flags can also be used to automatically determine whether excess electronic noise has arisen on the analog line, by ramping the cross calibrate comparator trip level over a known range and by observing whether the flags are observed at consistent trip levels over a period of time.

There are numerous advantages to collecting all of the signals simultaneously, even when analog data is in the (0,0) range. One advantage is that such collection permits the user to compare low signal analog data to high signal analog data, in case it is not desired to use a conversion factor, or in case the conversion factor is inaccurate or unsuitably imprecise, or if the pulse section fails for some reason. Another advantage is to permit diagnosis of system problems by comparing the low pulse count signal and low analog signal. For example, if both the pulse count and analog signals are above the known zero levels, it can be inferred that continuum chemical noise has been introduced into the system. This can be the case in ICP-MS systems where gas flows have been set incorrectly, or the vacuum pressure is high, or a skimmer orifice has increased in size (for example). If excess noise occurs on the pulse count section only, or analog section only, then the system problem likely relates to either electrical noise or detector problems.

While the flags have been described as being generated by a set of comparators, it will be appreciated that they can be created and recorded in various forms, e.g. as logic levels, signal levels, or in other ways. For example, the average analog signal level sent to the system controller can be used to determine what region the signal is in, and can therefore be used to set the appropriate flag. However this method is not as fast as that described.

While the use of four flags is preferred, if desired fewer flags can be used in appropriate circumstances. For example one flag can be used to indicate that the signal is in the pulse protect or analog only region 136 and a second flag to indicate that the signal is in the detector protect region 138. The absence of either of these flags can be stored as an additional bit of information or third flag to indicate that the signal is in one of the first two regions (pulse only or pulse plus analog), although which of these two regions the signal is in would not be distinguished when only three flags are used.

It will also be realized that although the signal is preferably taken from the analog electrode in order to disable the pulse count signal and in order to disable the detector as a whole, and also to determine which region the signal is in, a different electrode could be used for this purpose. For example a different electrode may be used within the detector 66 for this purpose. In addition, instead of using an electrode in the detector 66 to determine whether the system should be in detector protect (neither pulse nor analog) mode 138, a separate lens or electrode upstream of the detector 66 can be used, e.g. a Faraday cup. Such lens or other detector would determine whether the ion current is sufficiently intense that the detector 66 should be protected and to cause switching to detector protect mode.

Although preferred embodiments of the invention has been described, it will be appreciated that various changes may be made within the scope of the appended claims.

We claim:

1. A mass analyzer system comprising:

(a) a mass analyzer for scanning through a plurality for points in a mass spectrum and for dwelling at each point;

(b) an ion lens, (c) means for directing ions through said ion lens and into said mass analyzer, (d) a simultaneous mode electron multiplier detector coupled to said mass analyzer for detecting ions passing therethrough, (e) said detector comprising first and second dynode stages, and a plurality of electrodes including an analog signal electrode for providing an analog signal and a pulse counting electrode for providing a pulse count signal, (f) logic means including first and second comparator means coupled to one of said electrodes for receiving an indication of the level of said analog signal, said first comparator means being responsive to a predetermined level of said analog signal to disable said pulse count signal, said second comparator means being responsive to a second and higher level of said analog signal for reducing the number of ions incident on said detector for disabling both said analog and said pulse count signals, (g) said signals defining a first region in which at least one of said pulse count signal and said analog signal is valid, a second region in which only said analog signal is valid, and a third region in which neither said analog nor said pulse count signal is valid, (h) said logic means including means responsive to the region in which said signals are located for producing a first flag when said signals are in said first region, a second flag when said signals are in said second region, and a third flag when said signals are in said third region, said flags being different from each other, (i) memory means, (j) and means for transmitting to and storing in said memory means the values of said signals and their associated flags for each dwell of said mass analyzer.

2. A mass analyzer system comprising:

(a) a mass analyzer for scanning through a plurality of points in a mass spectrum and for dwelling at each point;

(b) an ion lens, (c) means for directing ions through said ion lens and into said mass analyzer, (d) a simultaneous mode electron multiplier detector coupled to said mass analyzer for detecting ions passing therethrough, (e) said detector comprising first and second dynode stages, a plurality of electrodes including an analog signal electrode located between said first and second dynode stages for providing an analog signal, and a pulse counting electrode associated with said second dynode stage for providing a pulse count signal, (f) logic means including first and second comparator means coupled to one of said electrodes for receiving an indication of the level of the analog signal, said first comparator means being responsive to a predetermined level of said analog signal to disable said pulse count signal, said second comparator means being responsive to a second and higher level of said analog signal for reducing the number of ions incident on said detector for disabling both said analog and said pulse count signals, (g) said signals defining a pulse count only region in which said pulse count signal only is valid, an overlap region in which both said pulse count signal and said analog signal are valid, an analog signal only region in which only said analog signal is valid, and a neither analog nor pulse region in which neither of said signals is valid, (h) said logic means including means responsive to the region in which said signals are located for producing a first flag when said signals are in said pulse only region, a second flag when said signals are in said overlap region, a third flag when said signals are in said analog only region, and a fourth flag when said signals are in said neither analog nor pulse region, said flags each being different from each other, (i) memory means, in said memory means the values of said signals and their associated flags for each dwell of said mass analyzer.

3. A system according to claim 2 and including means for automatically calibrating said detector, said means for calibrating including means for determining the relationship between said analog and pulse count signals in said overlap region at a plurality of different masses and for then producing a curve relating said analog signal to said pulse counting signal over said plurality of different masses.

4. A system according to claim 2 and including means for selectively displaying a mass spectrum formed from said pulse count signal in said pulse only region and said overlap region, a mass spectrum formed from said analog signal in said analog signal only region, and a mass spectrum formed from both said last mentioned signals.

5. A system according to claim 4 and including means for producing a flat top in each peak of said mass spectrum formed from said pulse count signal when said third flag is set and for producing a flat top in each peak of said mass spectrum formed from said analog signal when said fourth flag is set, and for producing a flat top in each peak of said mass spectrum formed from both said signals when said fourth flag is set.

6. A system according to claim 2 and including means for optimizing the gain of said detector by setting a high voltage on said detector at a predetermined level, determining a resultant gain of said detector, and then repeatedly modifying said high voltage level and determining said gain until said gain reaches a desired value.

7. A mass analyzer system according to claim 2 wherein said flags are all encoded in two digital bits.

8. A mass analyzer system according to claim 2 and including conversion means for converting said analog signal into a frequency signal having a predetermined relationship with said analog signal, and means for calibrating said detector by determining the relationship between said frequency signal and said pulse count signal in said overlap region.

9. A method of operating a mass analyzer system of the kind having a mass analyzer, an ion lens, means for directing ions through said ion lens into said mass analyzer, a simultaneous mode electron multiplier detector coupled to said mass analyzer for detecting ions passing therethrough, said detector comprising first and second dynode stages, and a plurality of electrodes including an analog signal electrode for providing an analog signal and a pulse counting electrode for providing a pulse count signal, said method comprising defining a first region in which at least one of said pulse count signal and said analog signal is valid, a second region in which only said analog signal is valid, and a third region in which neither of said signals is valid, and producing a first flag when said signals are in said first region, a second flag when said signals are in said second region, and a third flag when said signal are in said third region, said flags each being different from each other, and then scanning said mass analyzer system through a plurality of points in a mass spectrum, causing said mass analyzer system to dwell at each point, and transmitting to and storing in memory the pulse and analog signals produced at each point together with the flag associated with said signals at said point.

10. A method of operating a mass analyzer system of the kind having a mass analyzer, an ion lens, means for directing ions through said ion lens into said mass analyzer, a simultaneous mode electron multiplier detector coupled to said mass analyzer for detecting ions passing therethrough, said detector comprising first and second dynode stages, and a plurality of electrodes including an analog signal electrode for providing an analog signal and a pulse counting electrode for providing a pulse count signal, said method comprising defining a pulse count only region in which said pulse count signal only is valid, an overlap region in which both said pulse count signal and said analog signal are valid, an analog signal only region in which only said analog signal is valid, and a neither analog nor pulse region in which neither of said signals is valid, and producing a first flag when said signals are in said pulse only region, a second flag when said signals are in said overlap region, a third flag when said signals are in said analog only region, and a fourth flag when said signals are in said neither analog nor pulse region, said flags each being different from each other, and then scanning said mass analyzer system through a plurality of points in a mass spectrum, causing said mass analyzer system to dwell at each point, and transmitting to and storing in memory the pulse and analog signals produced at each point together with the flag associated with said signals at said point.

11. The method according to claim 10 and including the step, prior to scanning a mass spectrum, of optimizing the gain of said detector by setting a high voltage on said detector at a predetermined level, determining a resultant gain of said detector, and then repeatedly modifying said high voltage level and determining said gain, until said gain reaches a desired value.

12. The method according to claim 10 and including the step of calibrating said detector by determining the relationship between said analog and pulse count signals in said overlap region at a plurality of different masses and then producing a curve relating said analog signal to said pulse counting signal over said plurality of different masses.

13. The method according to claim 11, and including the step of providing a stream of ions into said system, said stream of ions being of a first intensity such as to cause said signal to be in one of said analog only region and said neither analog nor pulse region, and prior to the step of optimizing said detector, attenuating said stream of ions to a second intensity such that said signal is in said overlap region.

14. The method according to claim 12, and including the step of providing a stream of ions into said system, said stream of ions being of a first intensity such as to cause said signal to be in one of said analog only region and said neither analog nor pulse region, and prior to the step of calibrating said detector, attenuating said stream of ions to a second intensity such that said signal is in said overlap region.

15. The method according to claim 10 wherein each of said flags is encoded in two digital bits.

16. The method according to claim 10 and including the step of converting said analog signal into a frequency signal having a predetermined relationship with said analog signal, and employing said frequency signal to increment counting means.

17. A method according to claim 10 and including the step of displaying numeric maximum intensities of a plurality of desired peaks using said pulse counting signal only, and displaying with said numeric intensities an indication of whether said third flag has been set.

18. A method according to claim 10 and including the step of displaying numeric maximum intensities of a plurality of desired peaks using analog only signals, and displaying with said numeric intensities an indication of whether said fourth flag has been set.

19. A method according to claim 10 and including the step of displaying numeric maximum intensities of a plurality of desired peaks using said pulse count signals and said analog signals, and displaying with said intensities an indication of whether said third or fourth flags have been set.

20. A method according to claim 10 and including the step of producing a deadtime correction factor relating an observed pulse count to a true pulse count, by setting an initial deadtime correction factor, generating a set of points for different values of analog versus pulse count signals using said initial deadtime correction factor, fitting a straight line to said points and determining a correlation coefficient relating the fit of said line to said points, setting a new deadtime correction factor, repeating the generation of said points and the fitting of said curve and determining a new correlation coefficient, and continuing such procedure until a maximum correlation coefficient has been determined, and setting the deadtime correction factor as that at which said maximum correlation coefficient occurred.

21. A method according to claim 10 and including the step of comparing, in a dwell of said mass analyzer, the average signal level occurring at such dwell with the flag produced for such dwell, and if said average signal level is in a region different from that in which said flag is set, then diagnosing that a problem exists such as that sample introduction is noisy or that the settling time before commencing signal counting is too short.

22. A method according to claim 10 and including the step of generating and displaying, from said analog and pulse count signals, a mass spectrum, and displaying with said mass spectrum an indication of which region the signal was in which produced each part of the said mass spectrum.

23. A method according to claim 22 wherein said indication is by color coding the display of said mass spectrum so that a different color is displayed for the part of the signal in each region.

24. A method according to claim 22 wherein said indication includes displaying a demarcation line between the signals in each region.

25. A method of operating a mass analyzer system of the kind having a mass analyzer, an ion lens, means for directing ions through said ion lens into said mass analyzer, a simultaneous mode electron multiplier detector coupled to said mass analyzer for detecting ions passing therethrough, said detector comprising first and second dynode stages, and a plurality of electrodes including an analog signal electrode for providing an analog signal and a pulse counting electrode for providing a pulse count signal, said method comprising defining a first region in which at least one of said pulse count signal and said analog signal is valid, a second region in which only said analog signal is valid, and a third region in which neither of said signals is valid, directing a stream of ions into said system, said stream being of a first intensity such as to cause said signal to be in one of said second region and said third region, attenuating said stream of ions to reduce the intensity thereof to a second intensity such that said signal is in said first region, then calibrating said detector by determining the relationship between said analog and said pulse count signals in said overlap region at a plurality of different masses and producing a curve relating said analog signal to said pulse counting signal over said plurality of different masses.

26. A method according to claim 25 and including the step of optimizing the gain of said detector, after the step of attenuating said stream of ions, by setting a high voltage on said detector at a predetermined level, determining a resultant gain of said detector, and then repeatedly modifying said high voltage level and determining said gain, until said gain reaches a desired value.

27. A method according to claim 25 and including performing said step of calibrating automatically at repeated spaced intervals.

28. A method according to claim 27 and including the steps of producing a first flag when said signals are in said first region, a second flag when said signals are in said second region, and a third flag when said signals are in said third region, said flags each being different from each other, and then scanning said mass analyzer system through a plurality of points in a mass spectrum, causing said mass analyzer system to dwell at each point, and transmitting to and storing in memory the pulse and analog signals produced at each point together with the flag associated with said signals at said point.

29. A method of storing and then processing a signal stream from a mass spectrometer system, said system being of the kind having a mass analyzer, means for directing ions through said ion lens into said mass analyzer, and an electron multiplier detector coupled to said mass analyzer for detecting ions passing therethrough, said signal stream comprising at least one of a pulse count signal and an analog signal, said signal stream having a pulse count only region in which said pulse count signal only is valid, an overlap region in which said pulse count signal and said analog signal are valid, an analog signal only region in which only said analog signal is valid, and a neither analog nor pulse region in which neither of said signals is valid, said signal stream further including a first flag when said signals are in said pulse only region, a second flag when said signals are in said overlap region, a third flag when said signals are in said analog only region, and a fourth flag when said signals are in said neither analog nor pulse region, said flags each being different from each other, said method comprising storing in memory data from said signal stream indicative of the values of at least one of said pulse count signal and said analog signal at a plurality of points in a mass spectrum, storing in memory the said flag associated with the signal at each said point, then retrieving from memory said data representative of said signal at at least some of said points, together with the flag associated with the data at each such point, and then displaying from the retrieved data a characteristic of said mass spectrum.

* * * * *